Jan. 7, 1969

N. F. BROWN ET AL 3,420,095

LEAK TESTER FOR FLOW CONDUCTORS

Filed Sept. 12, 1966

INVENTORS
DUDLEY J. MEAUX
NORMAN F. BROWN
JACK W. TAMPLEN

BY *Hastings Ackley*
and
*Walter J. Jagmin*
ATTORNEYS

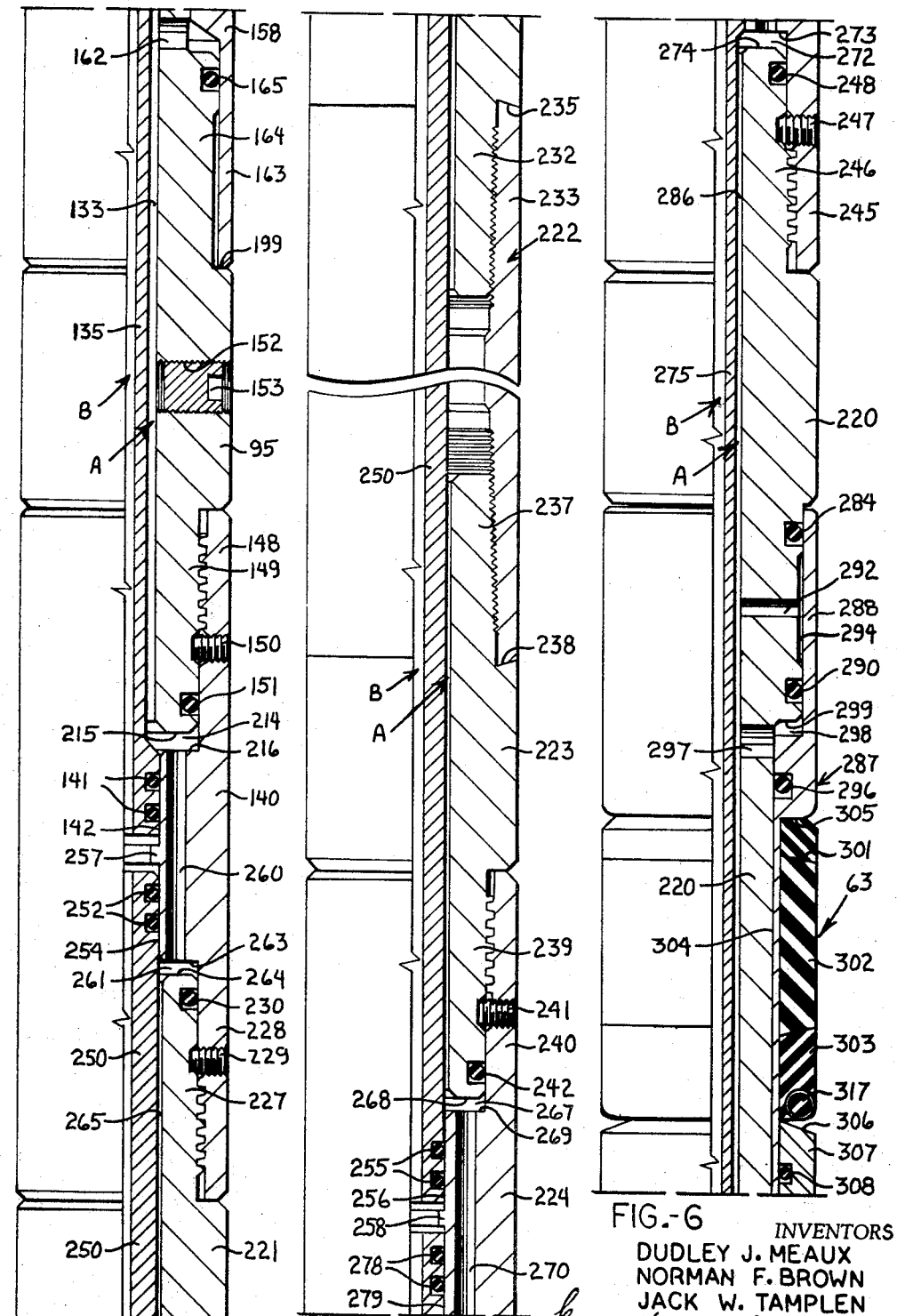

INVENTORS
DUDLEY J. MEAUX
NORMAN F. BROWN
JACK W. TAMPLEN
BY Hastings Ackley
and
Walter J. Jagm
ATTORNEYS

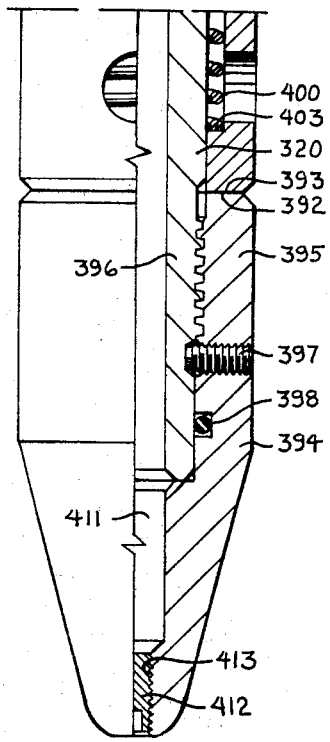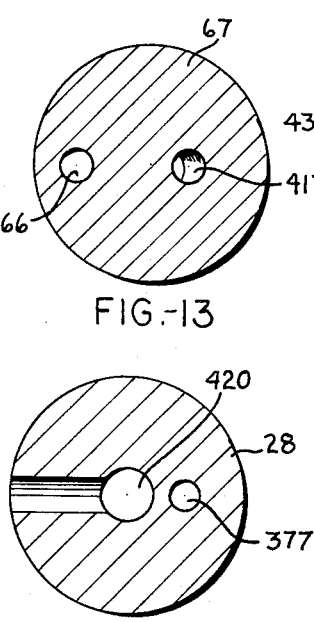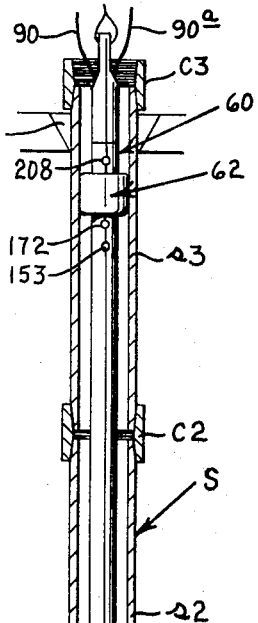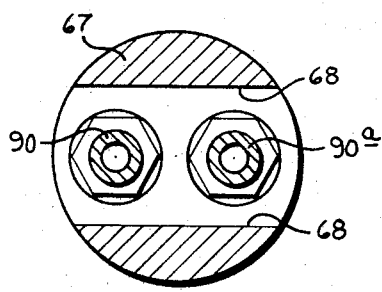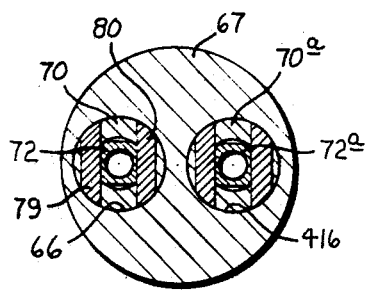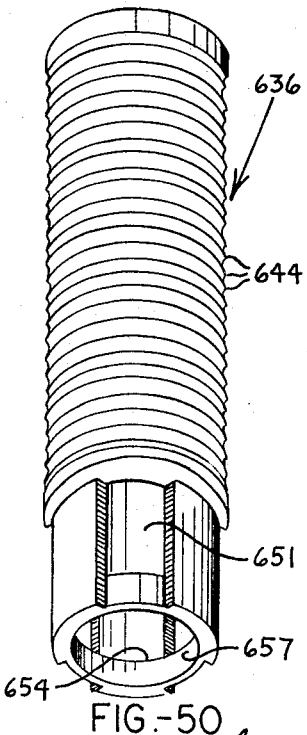
INVENTORS
DUDLEY J. MEAUX
NORMAN F. BROWN
JACK W. TAMPLEN Jan. 7, 1969
N. F. BROWN ET AL
3,420,095
LEAK TESTER FOR FLOW CONDUCTORS
Filed Sept. 12, 1966
Sheet 5 of 17
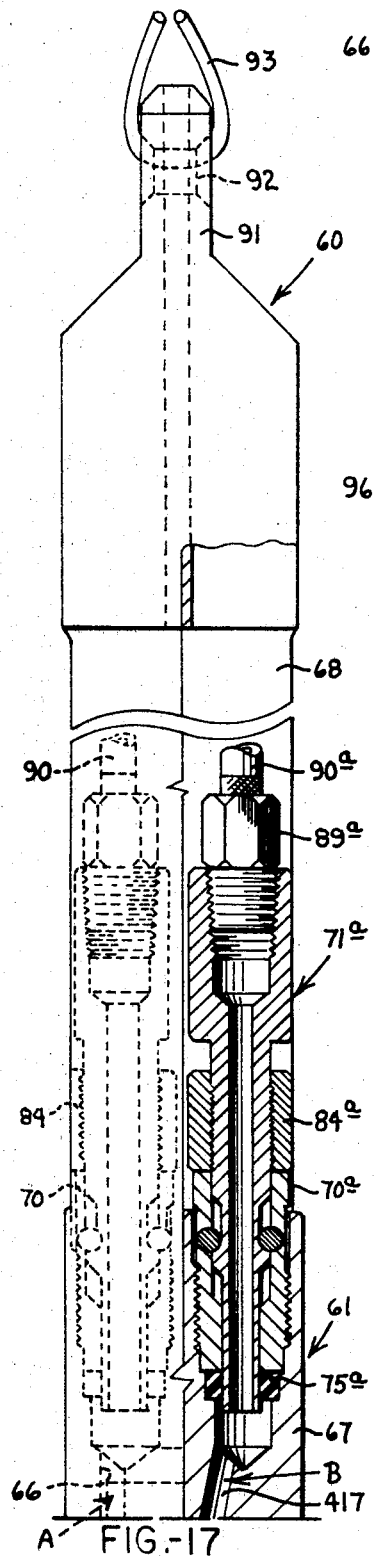
FIG.-17
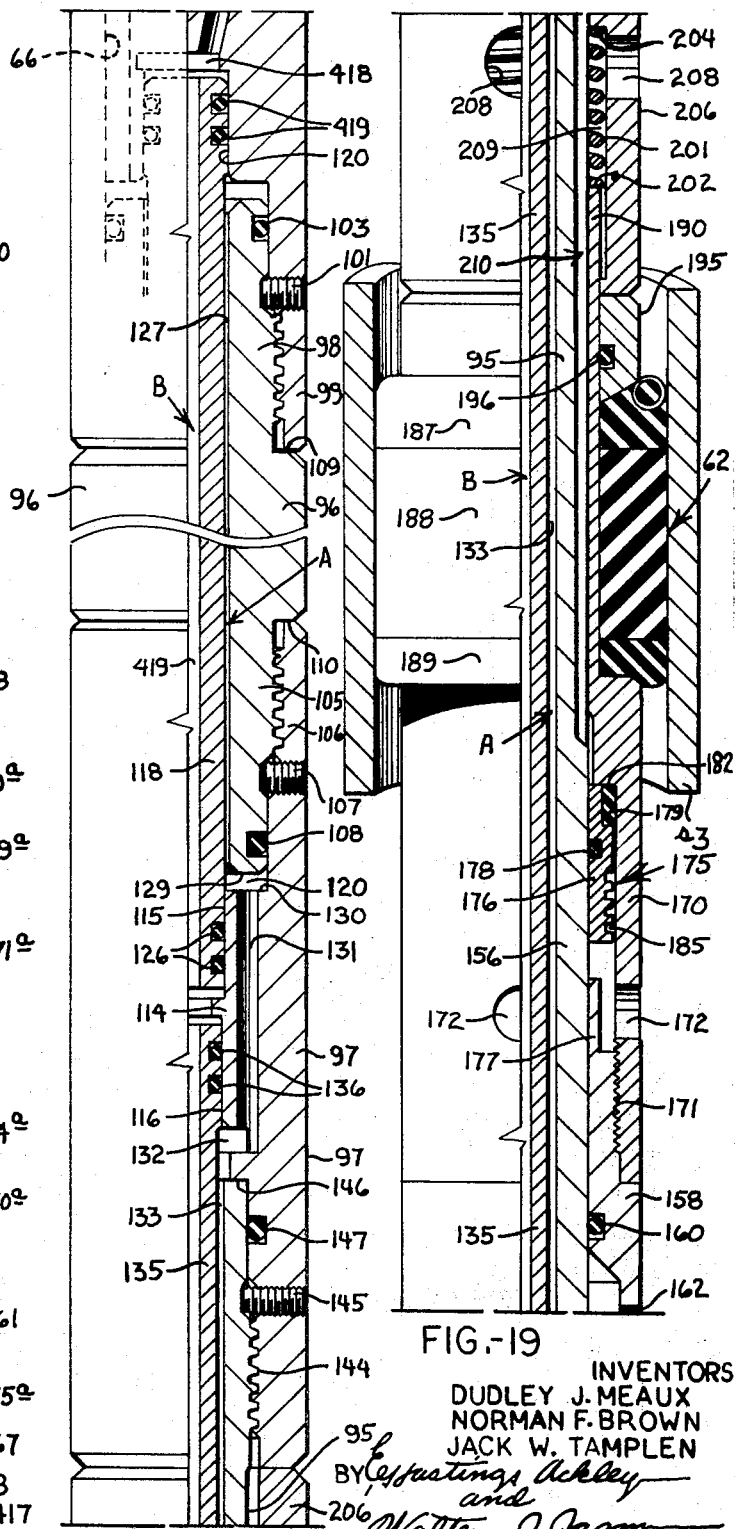
FIG.-18
FIG.-19
INVENTORS
DUDLEY J. MEAUX
NORMAN F. BROWN
JACK W. TAMPLEN
ATTORNEYS

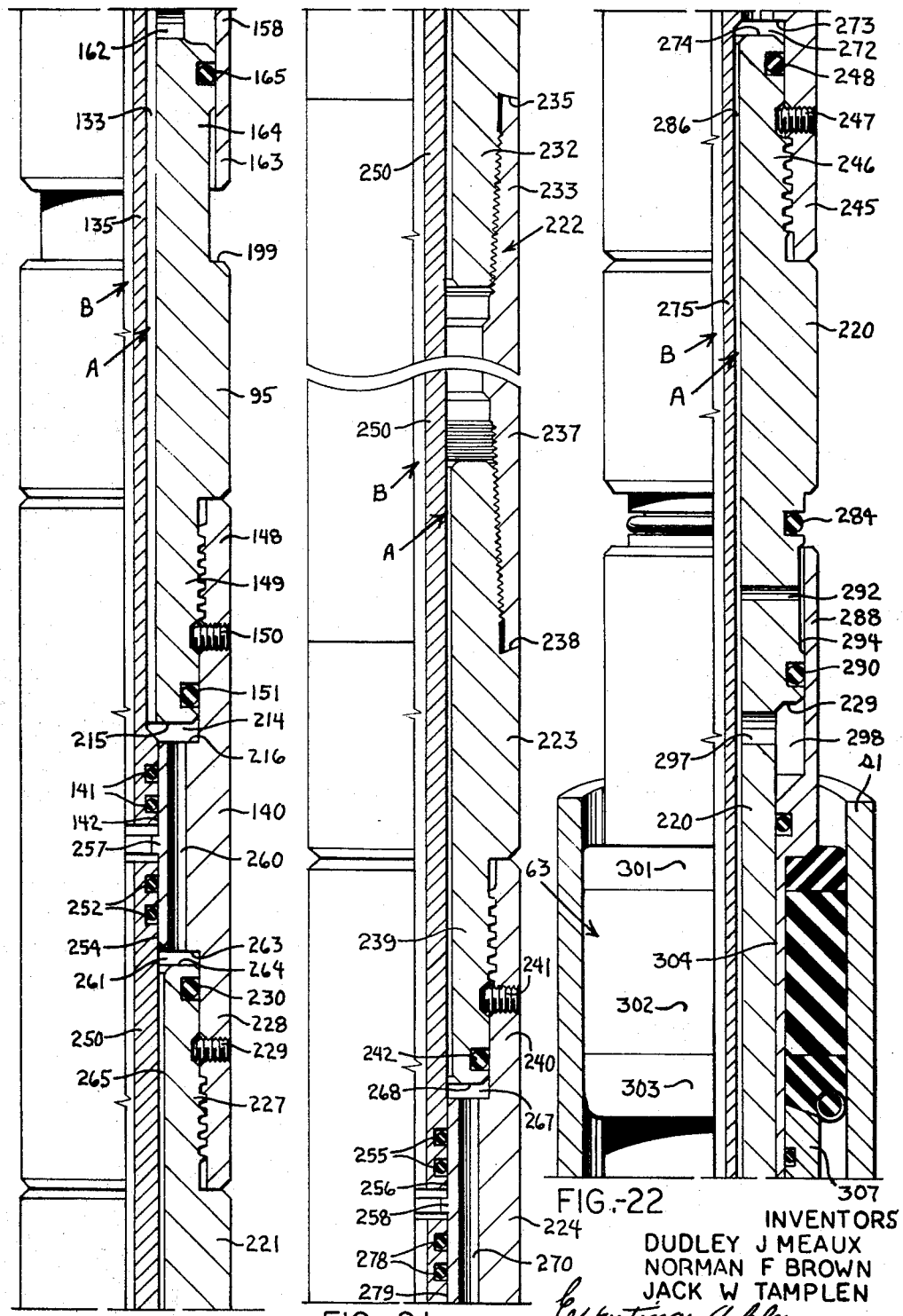

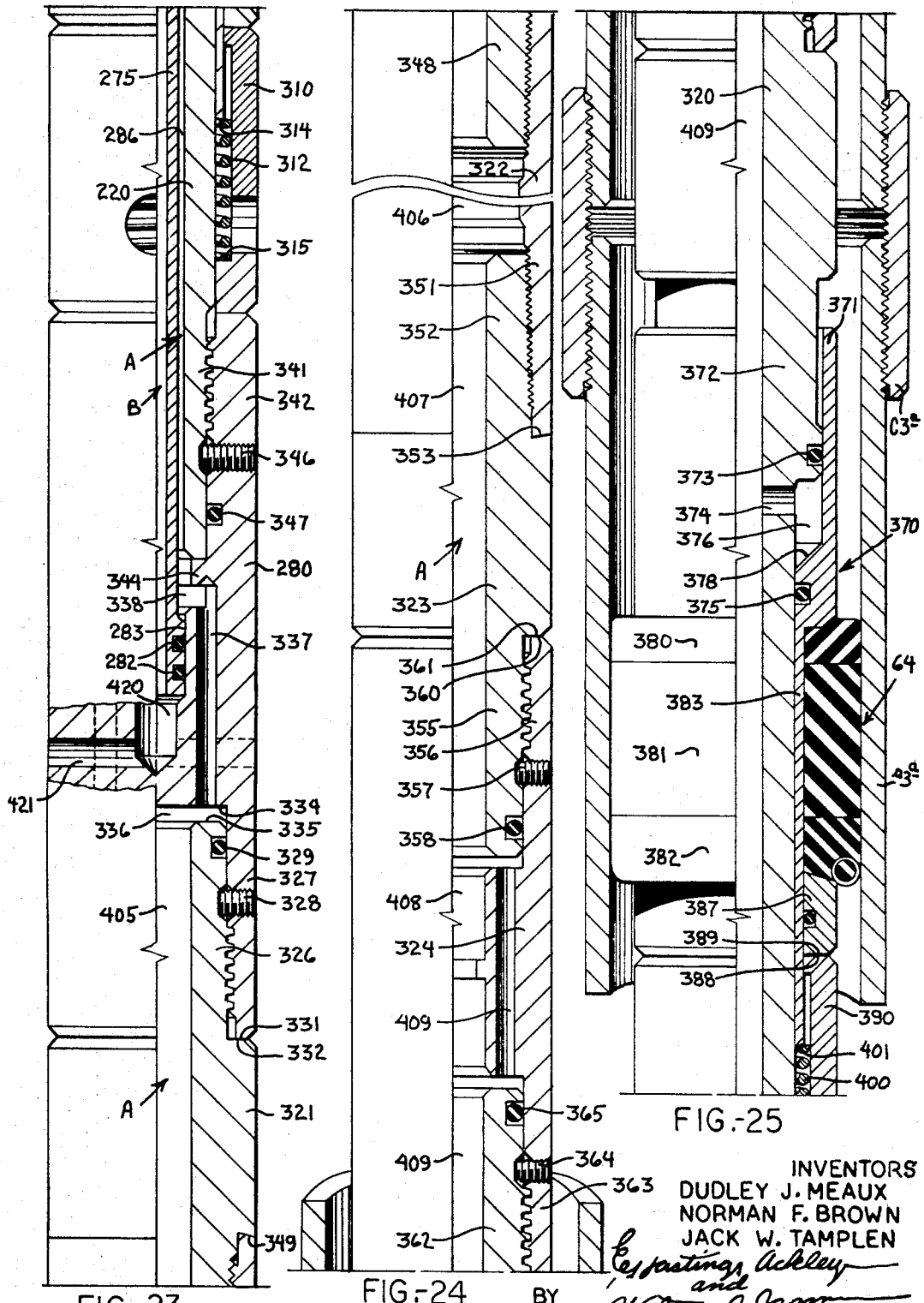

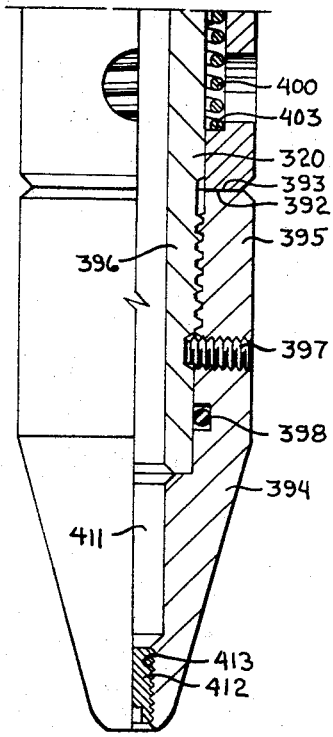
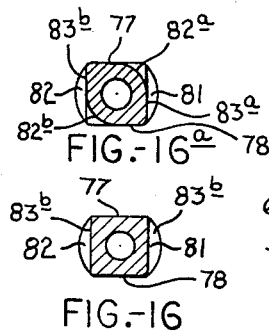
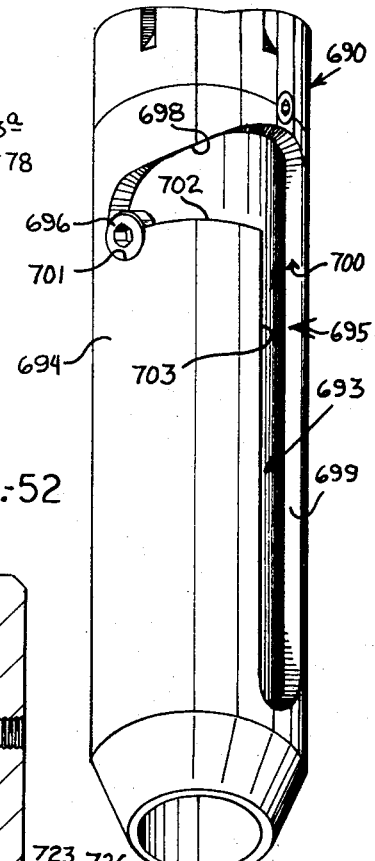
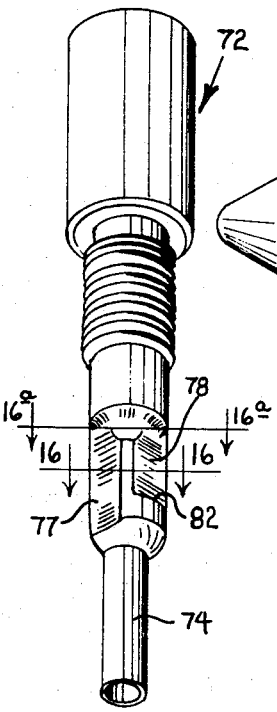
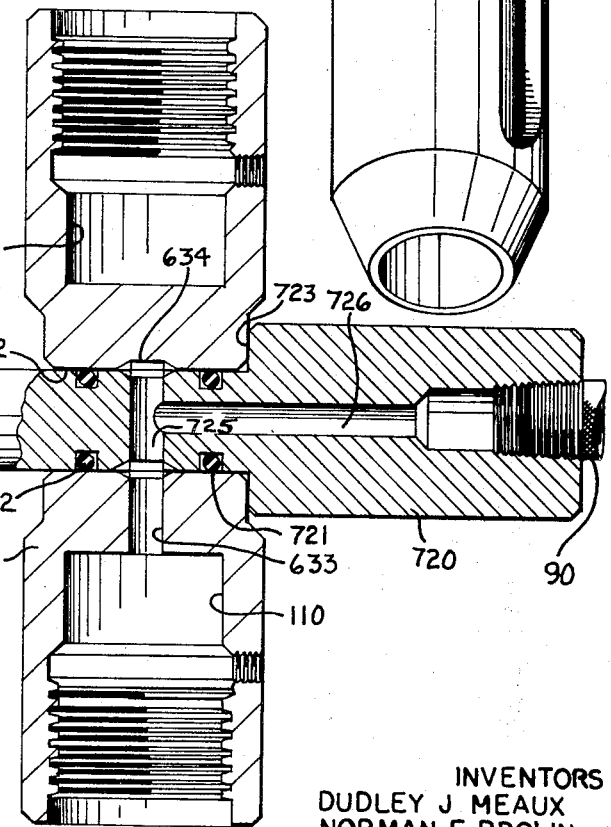

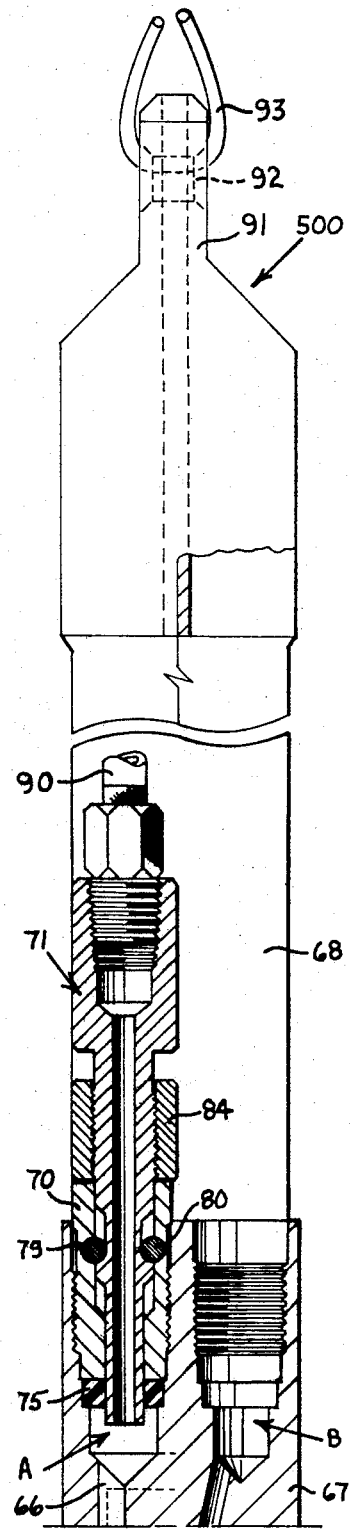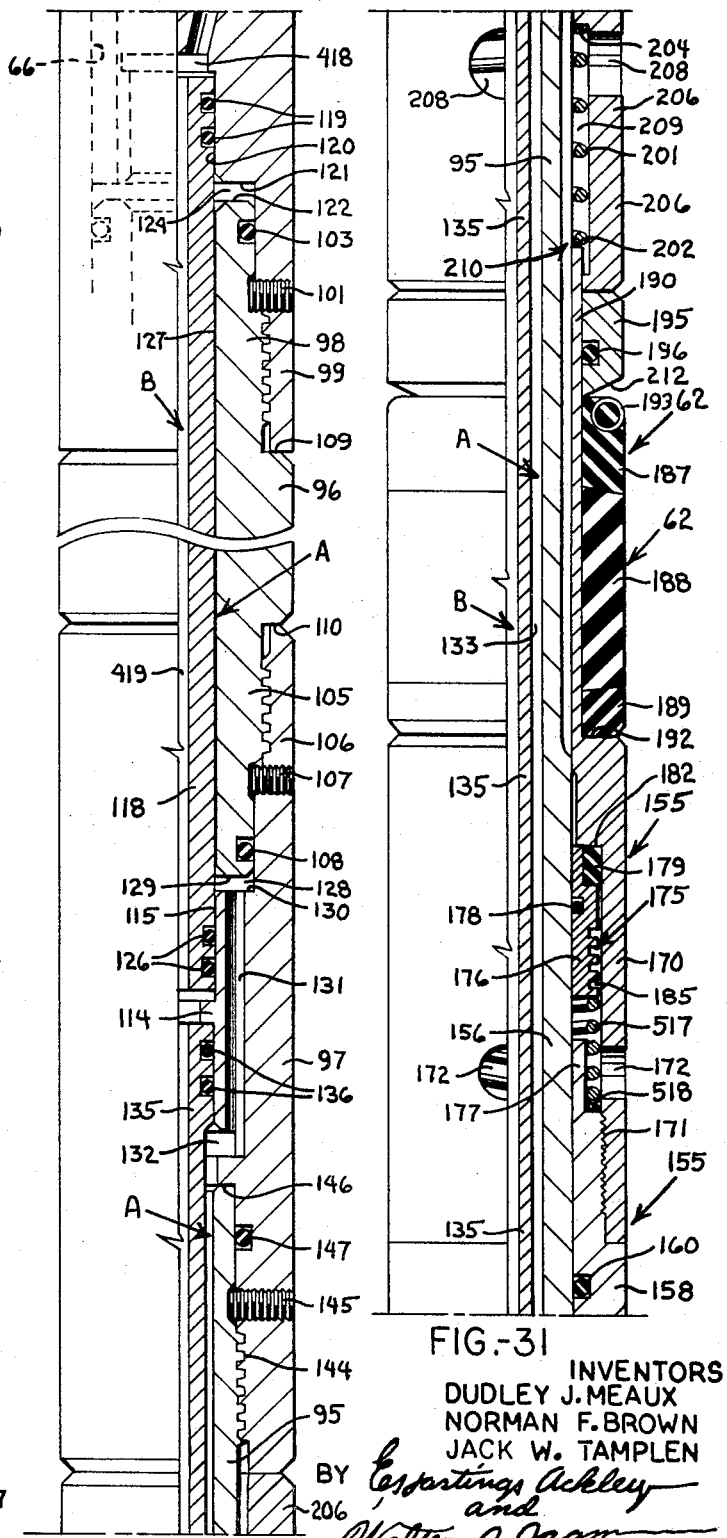

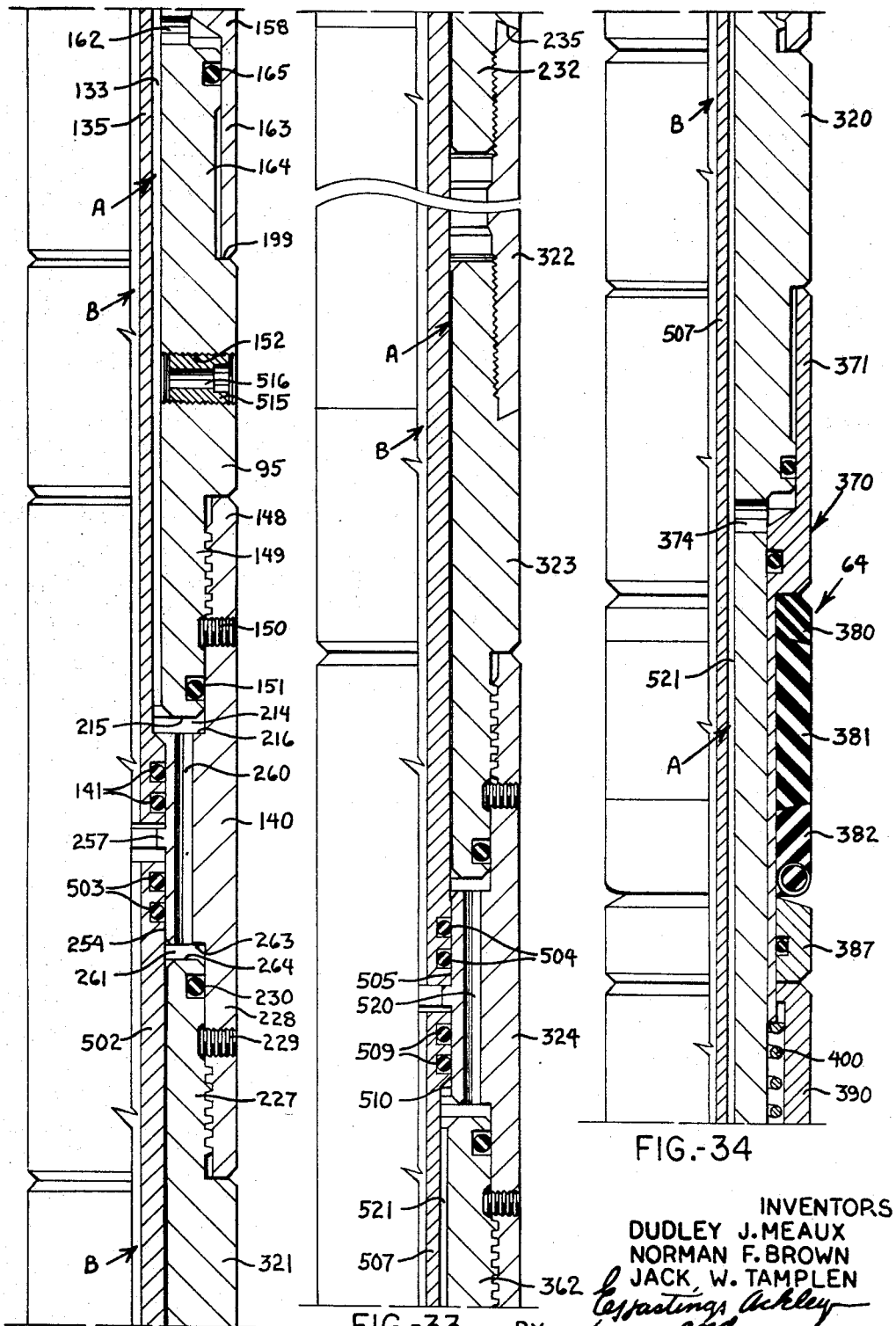

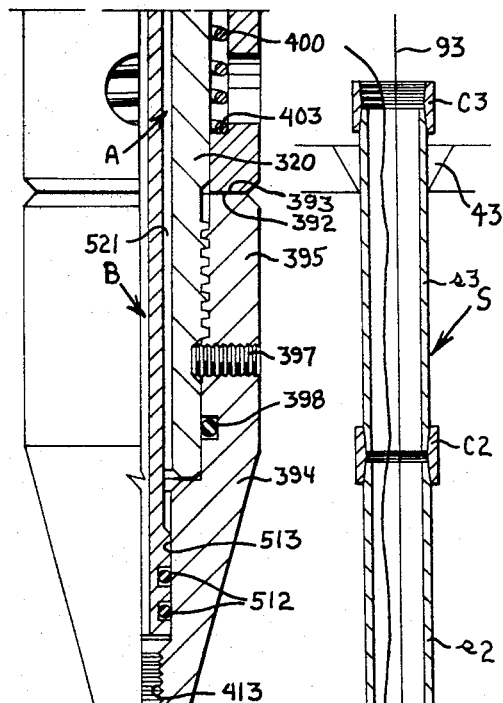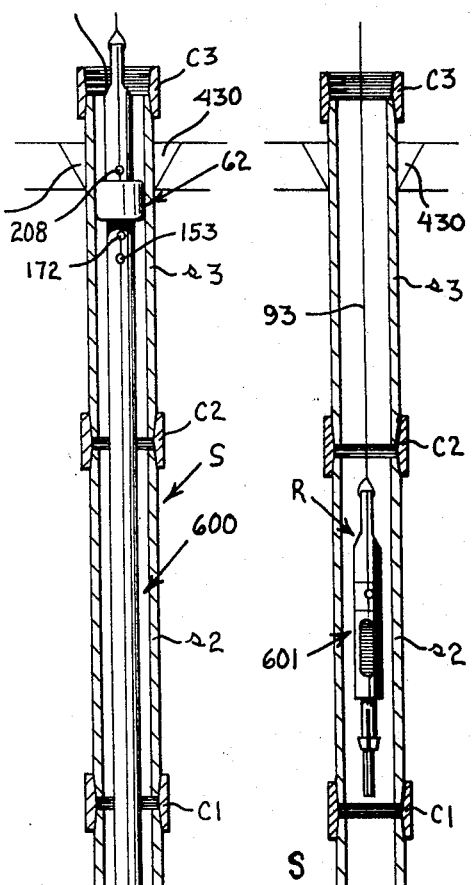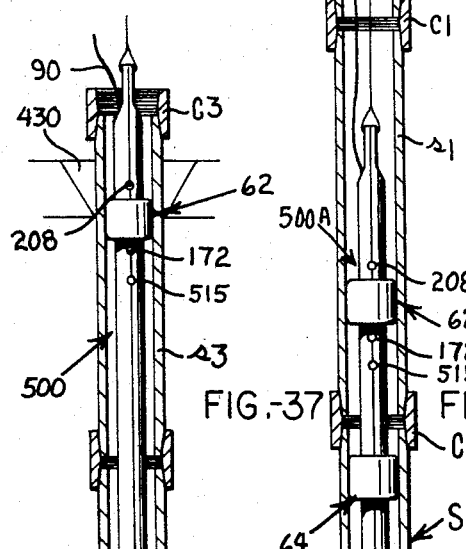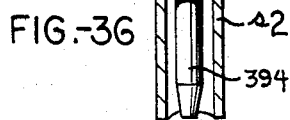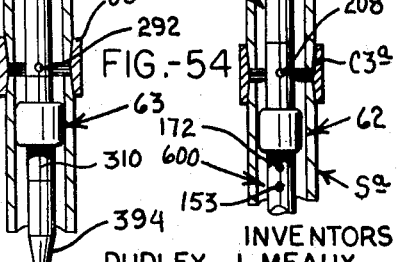

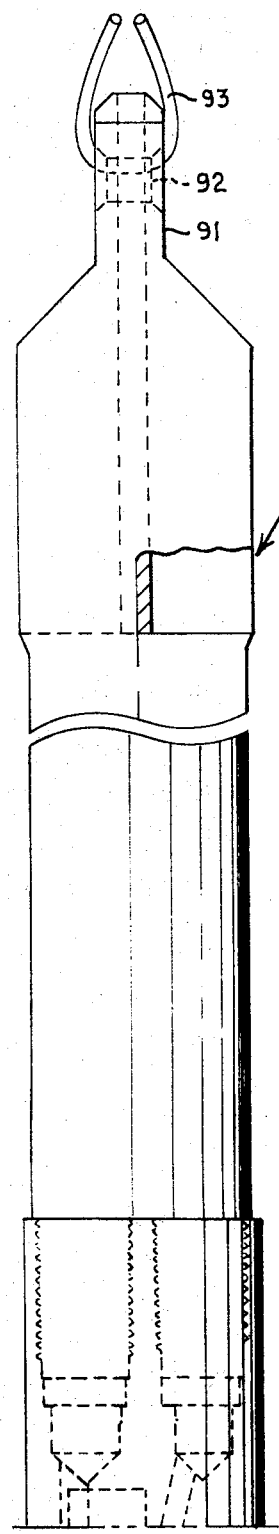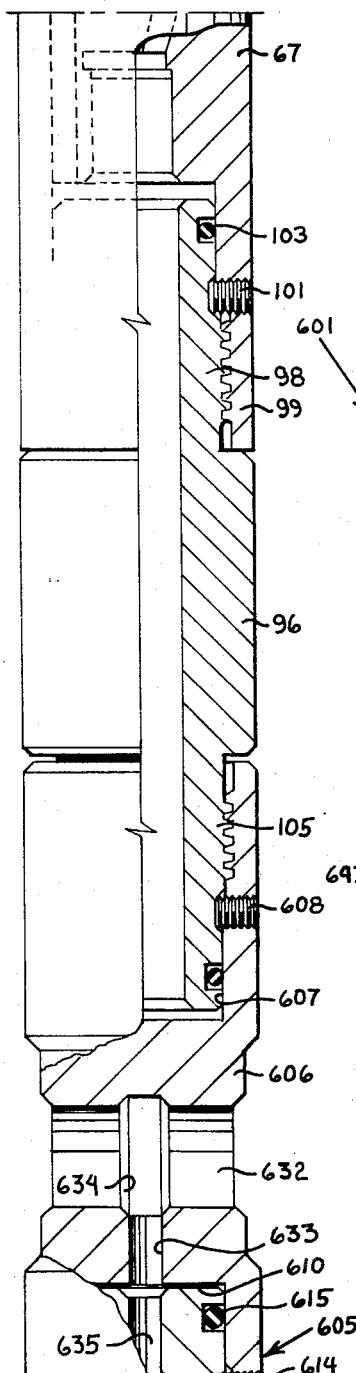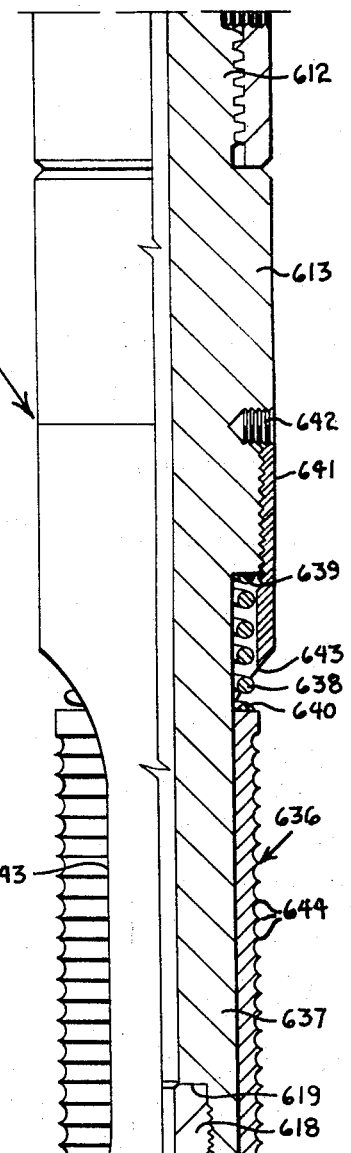

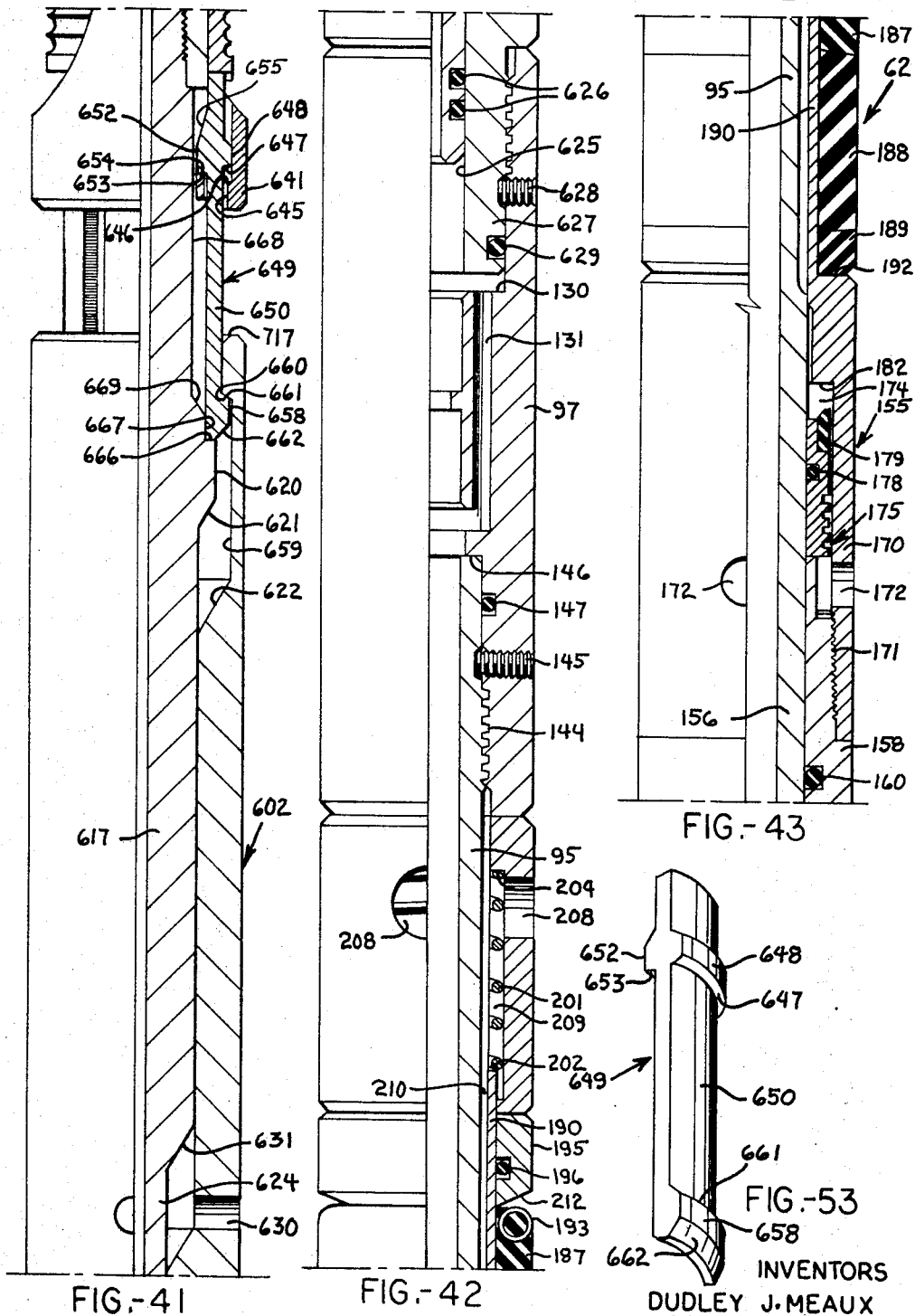

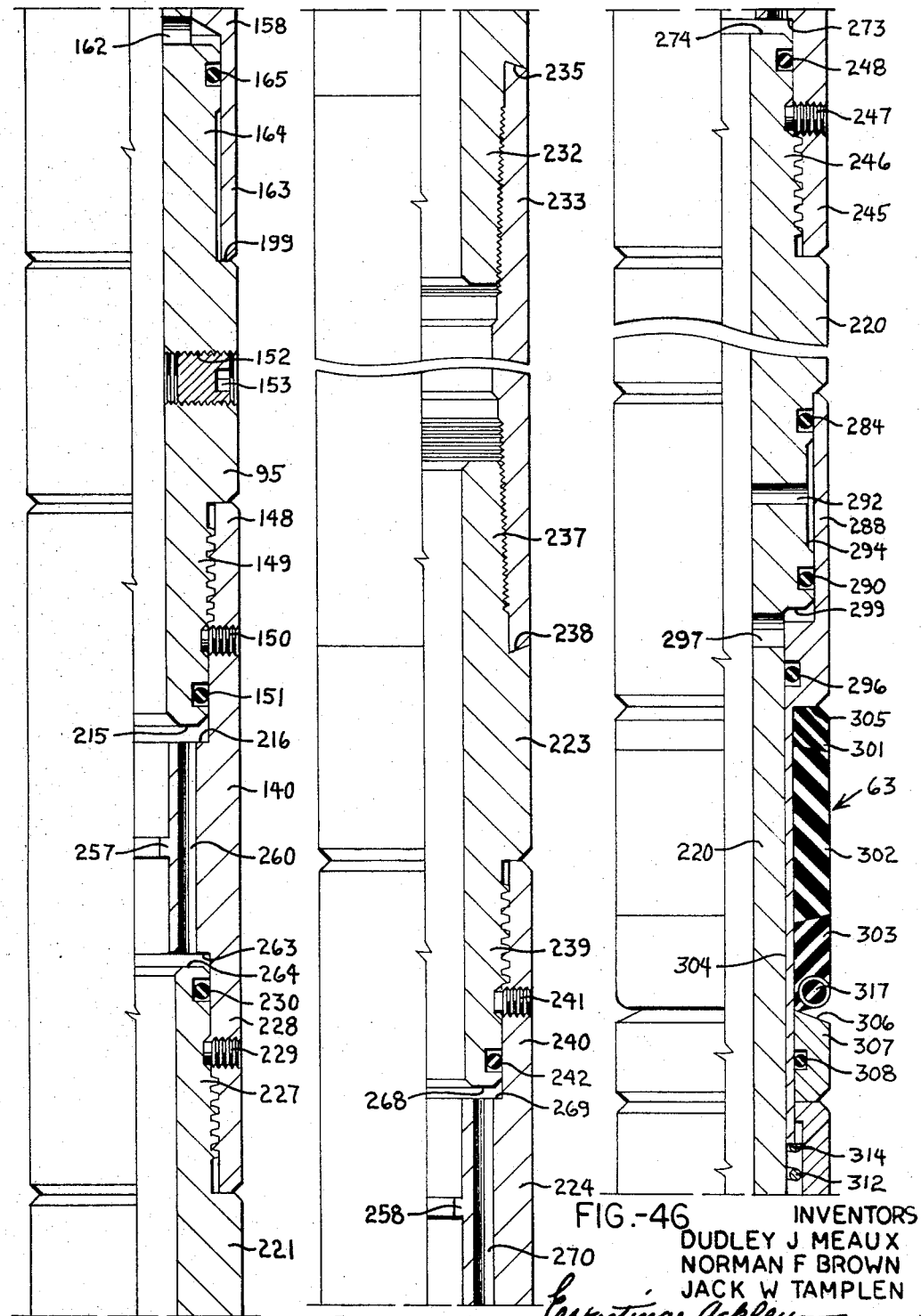

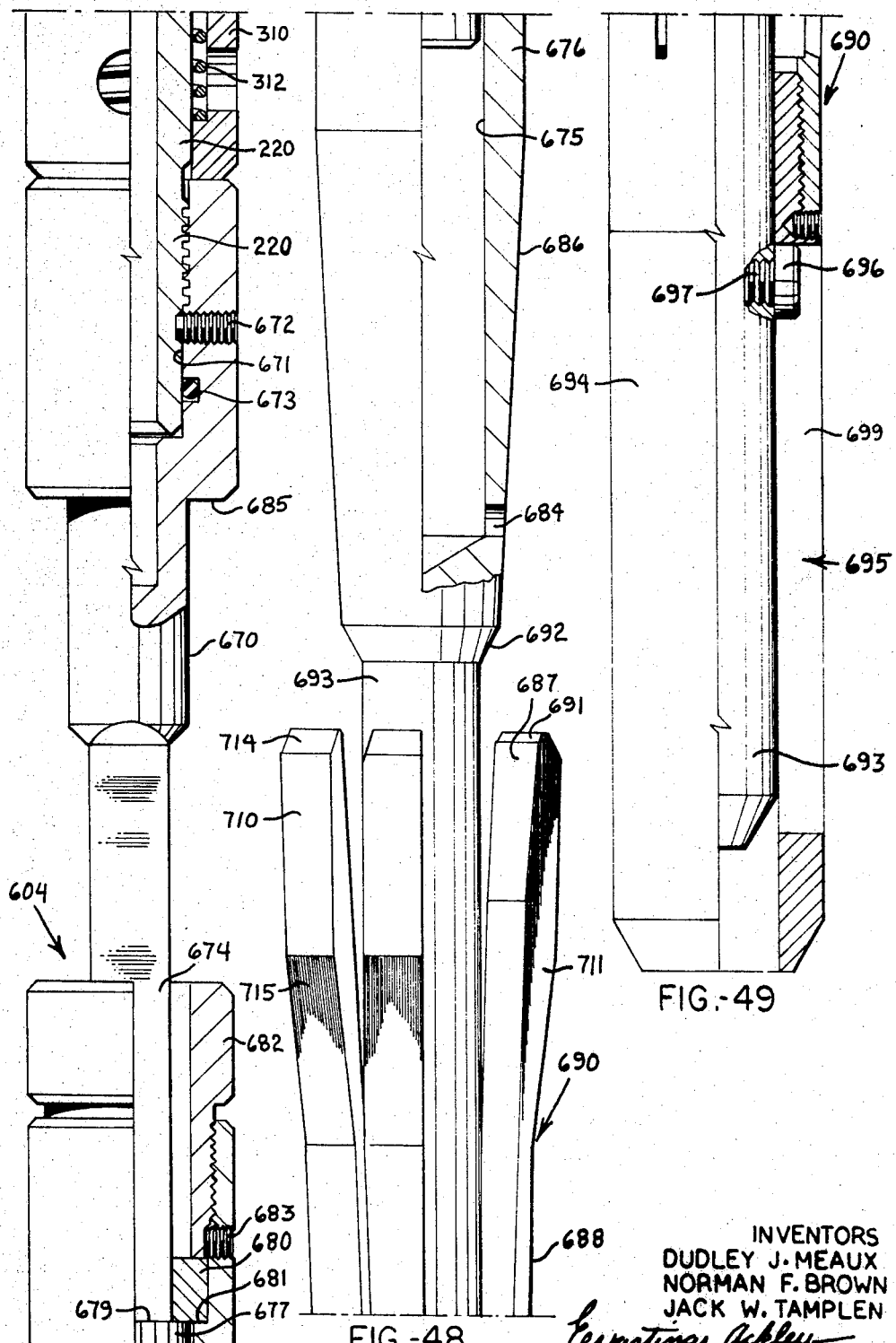

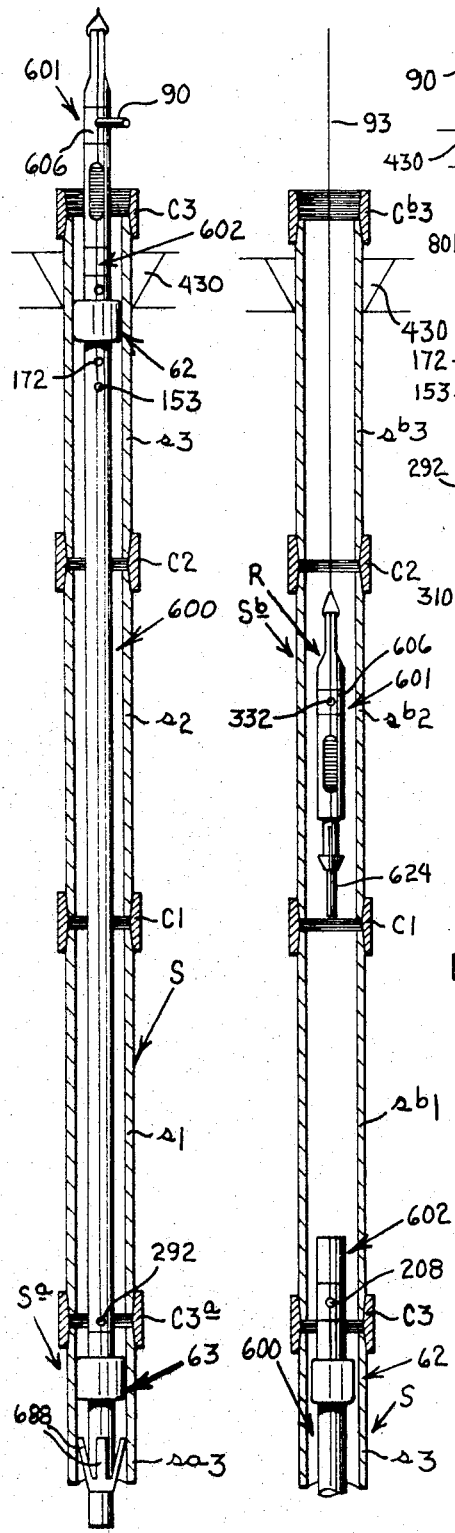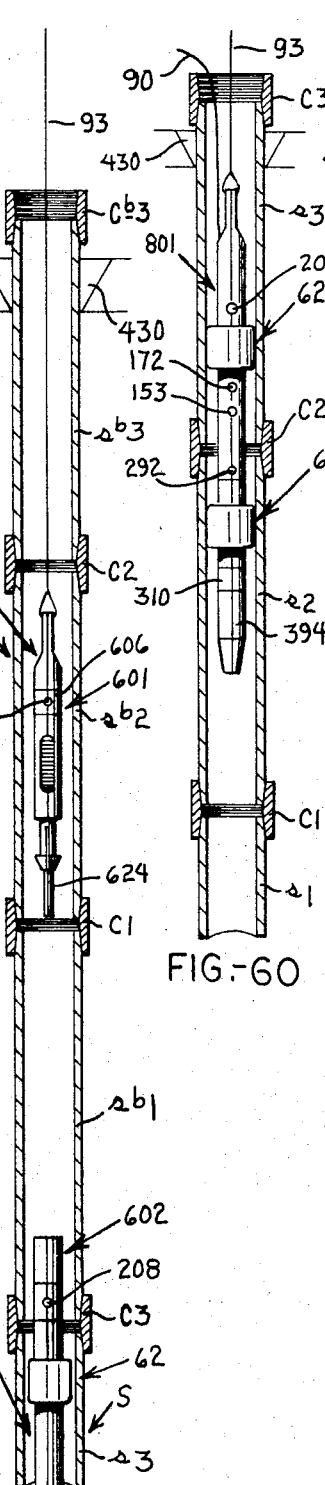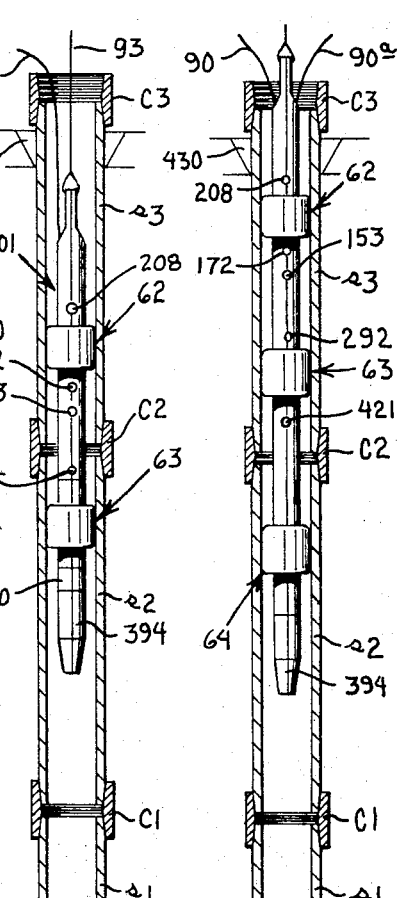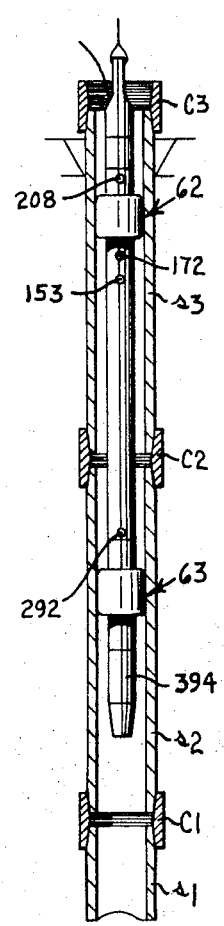
FIG.-55  FIG.-56  FIG.-60  FIG.-28  FIG.-61
INVENTORS
DUDLEY J MEAUX
NORMAN F BROWN
JACK W TAMPLEN
ATTORNEYS United States Patent Office 3,420,095
Patented Jan. 7, 1969

3,420,095
LEAK TESTER FOR FLOW CONDUCTORS
Norman F. Brown, Dallas, Jack W. Tamplen, Celina, and Dudley Joseph Meaux, Dallas, Tex., assignors to Otis Engineering Corporation, Dallas, Tex., a corporation of Delaware
Filed Sept. 12, 1966, Ser. No. 578,572
U.S. Cl. 73—40.5                                    35 Claims
Int. Cl. G01m 3/08

ABSTRACT OF THE DISCLOSURE

A pipe and joint tester having packer means sealing off the joint or coupling between two coupled lengths of pipe separately from a packer means sealing between one length of pipe and the tester, whereby the coupling or joint may be tested with gas and the remainder of one length of pipe tested with liquid, for pressure leaks. Testing may be done simultaneously with the two types of fluids, or the testing may be done by gas alone or liquid alone, if desired. Releasable anchor means is provided for supporting the tester in the pipe while additional lengths of pipe are connected.

This invention relates to testers and more particularly to a tester for testing a flow conductor for leaks.

An object of the invention is to provide a new and improved tester which may be inserted into a flow conductor to test the flow conductor for leaks.

Another object is to provide a tester which may be inserted into a flow conductor, such as a string of tubing as it is being made up and run into a well to test a portion of the tubing, such as the last connected section of tubing, stand of tubing composed of several sections or a joint or connection of two sections of the tubing.

Still another object is to provide a tester having at least two spaced packer assemblies which are expandable by a fluid under pressure supplied to the tester to seal between the tester and the tubing and having means for introducing a fluid under pressure into the annulus between the tubing and the tester between the two packer assemblies to test the portion of the tubing between the two packer assemblies for leaks.

A further object is to provide a tester which may be used to test the uppermost portion of the string of tubing with one fluid such as water and the joint or connection of the top portion of the tubing with the next lower portion of the tubing with a gas, it being preferred to test the joint or connection at which leaks are more likely to occur, with gas under pressure since the gas under pressure leaks more readily through even very small openings and it being preferred to test the top portion of the tubing with a liquid for reasons of economy of time and expense since a large volume of air would have to be compressed and a relatively long time would be required to introduce it into the tubing if the distance between the packer assemblies is relatively great.

A still further object is to provide a tester having an elongate body on which are mounted three packer assemblies movable to their operative expanded positions to close the annulus between the tester and the tubing at three longitudinally spaced locations by liquid introduced into a first passage of the body, the tester having a first port through which liquid may enter the annulus between the top and middle packer assemblies and a second passage and a port opening from the second passage to the annulus between the middle and bottom packer assemblies through which gas under pressure may be introduced into the annulus between the top and bottom packer assemblies.

Another object is to provide a packer wherein the tester has a bypass passage through which air trapped in the annulus between the top and middle packer assemblies may escape as the annulus is filled with liquid.

Still another object is to provide a tester wherein the tester has a closure means for closing the bypass passage when the annulus between the top and middle packers becomes filled with liquid.

An important object is to provide a tester which may be easily and quickly converted from a tester for testing simultaneously with liquid and gas to a tester for testing only with liquid or only with gas.

Another object is to provide a tester whose body is formed of releasably secured sections so that the distance between adjacent packer assemblies may be varied easily.

A further object is to provide a tester whose top portion of short length above the uppermost packer assembly is detachably secured to the lower portions of long length by a latch assembly and which is provided at its bottom end with an anchor assembly which prevents downward movement of the tester in a tubing and permits its upward movement therein whereby after the tester has been used to test a portion of the tubing, another section or stand of the tubing may be connected to the tubing string and the string lowered into the well, the tester top portion may be lowered again into the tubing and latched to the tester bottom portion and the tester may be raised to test the newly connected portion of the tubing and the joint or connection of its lower end with the string of previously tested tubing.

Additional objects and advantages of the invention will be readily apparent from the reading of the following description of a device constructed in accordance with the invention, and reference to the accompanying drawings thereof, wherein:

FIGURES 1 through 10 are vertical partly sectional views, with some portions broken away, of a tester embodying the invention for testing a stand or connection substantially the full length of a stand of tubing with water and simultaneously testing its joint or connection of its lower end with the top end of the next lower stand with a gas, the tester being shown with its packer assemblies in their inoperative positions;

FIGURES 11, 12 and 13 are sectional views taken on lines 11—11, 12—12, and 13—13, respectively, of FIGURE 1;

FIGURE 14 is a sectional view taken on line 14—14 of FIGURE 7;

FIGURE 15 is a perspective view of a section of a quick disconnect assembly of the tester;

FIGURES 16 and 16-A are sectional views taken on lines 16—16 and 16-A—16-A, respectively, of FIGURE 15;

FIGURES 17 through 26 are vertical partly sectional views, with some portions broken away, of the tester illustrated in FIGURES 1 through 10 showing the tester in a string of tubing and its packer assemblies in their operative positions.

Figure 1:
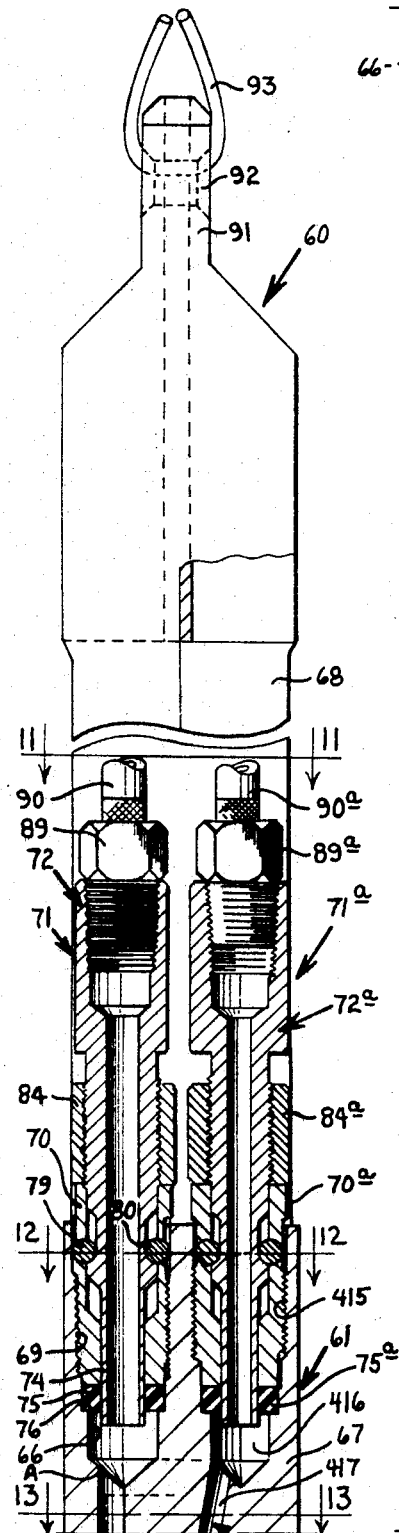
Figure 2:
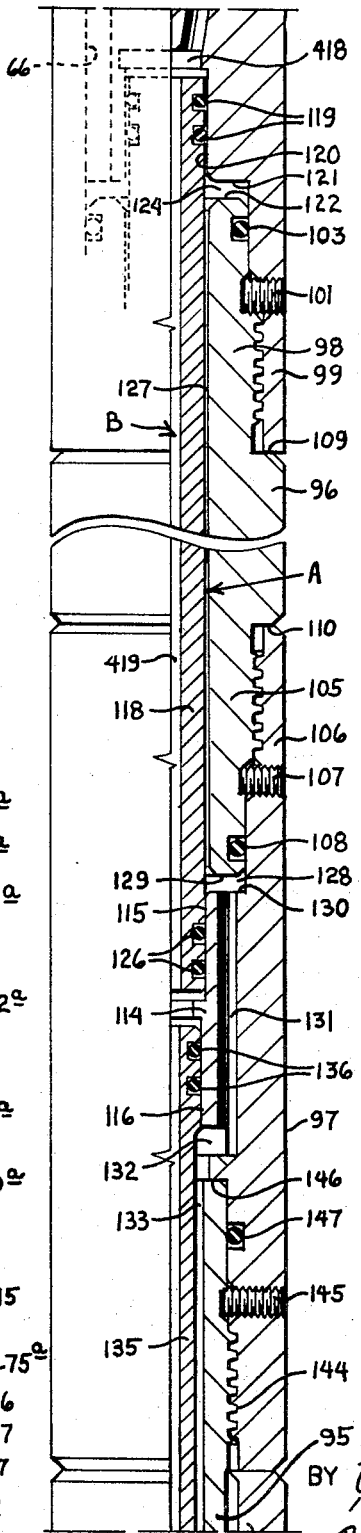
Figure 3:
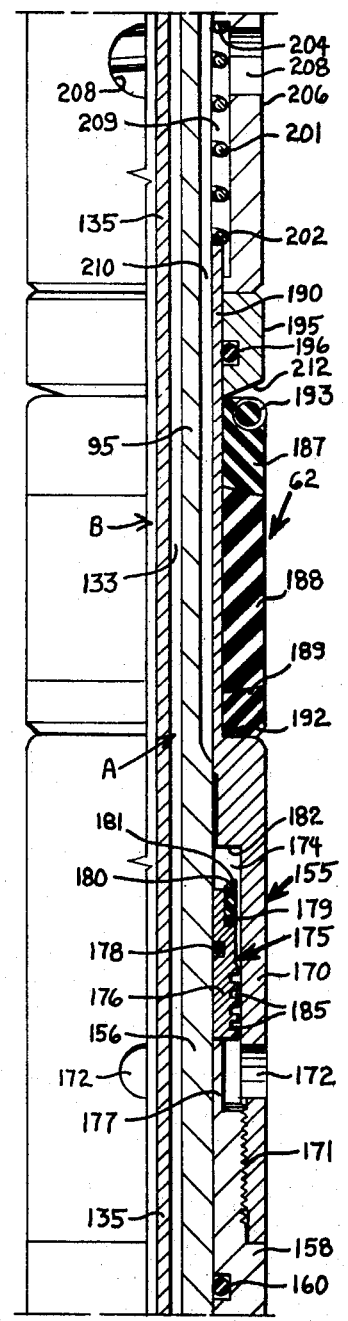
Figure 7:
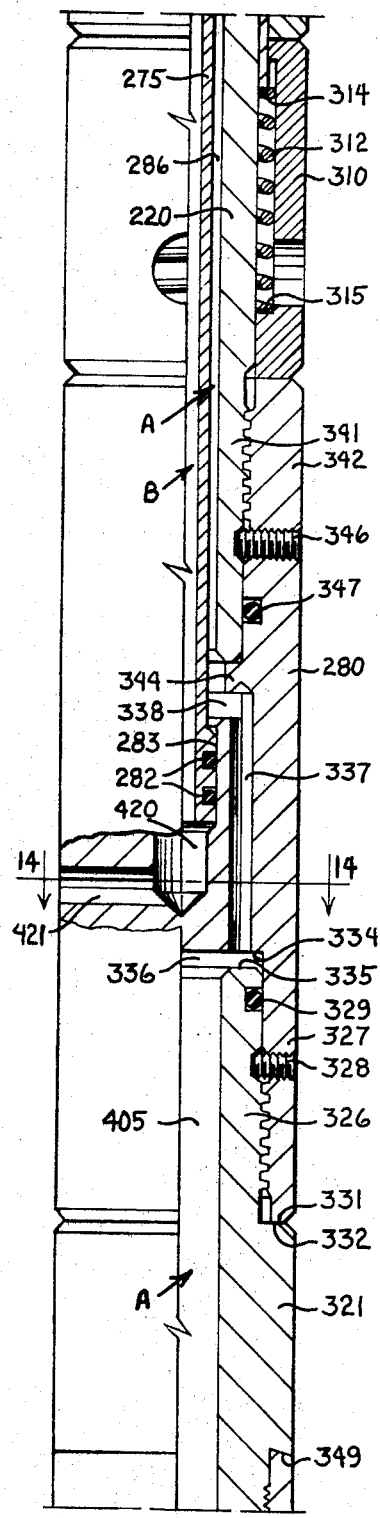
Figure 8:
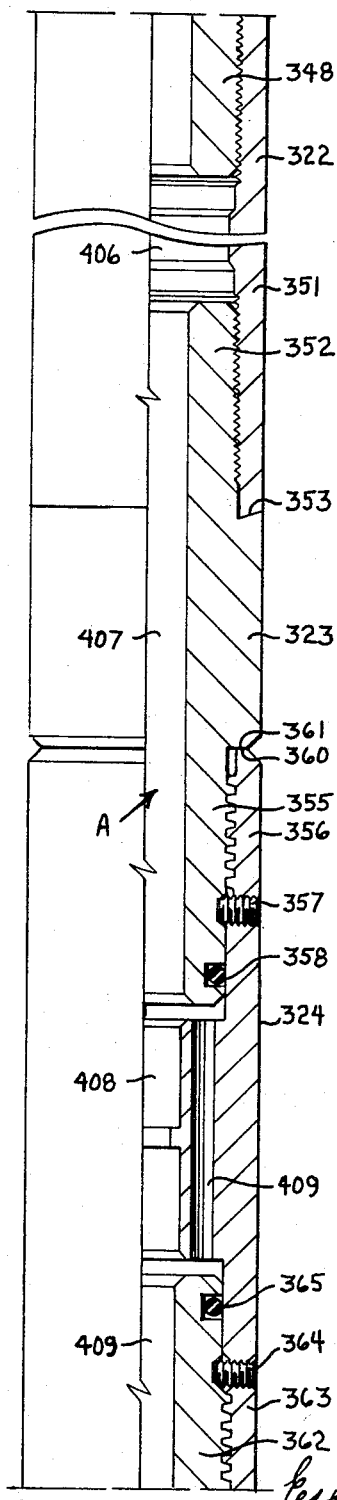
Figure 9:
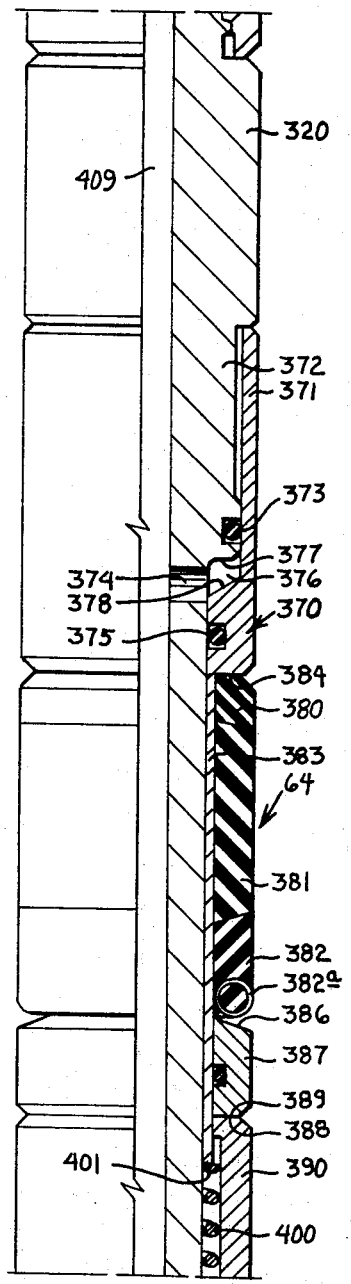
Figure 58:
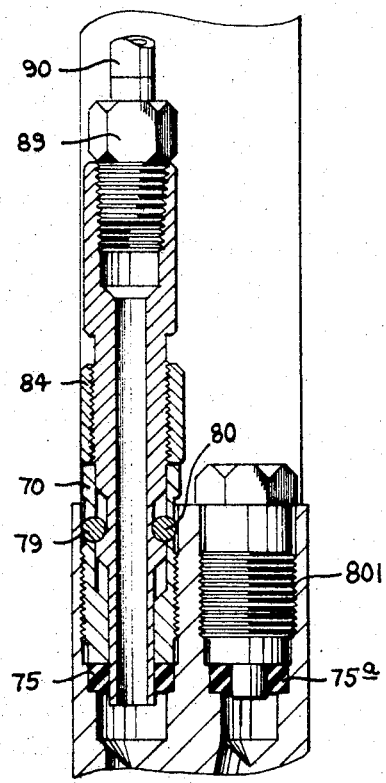
Figure 59:
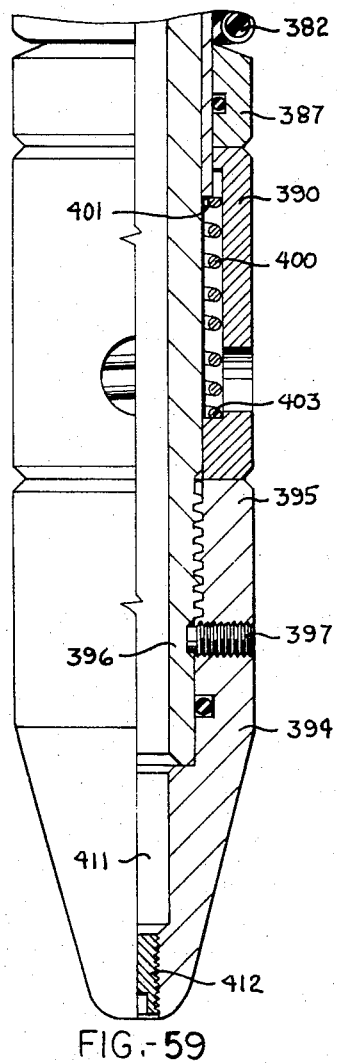

FIGURE 27 is a schematic view showing the tester illustrated in FIGURES 1 through 26 in use testing the uppermost stand of a string of tubing with a liquid and the joint or connection of the lower end of the stand with the top end of the next lower stand with gas;

FIGURE 28 is a schematic view similar to FIGURE 27 showing a modified form of the tester with the distance between its top and middle packer assemblies shorter than that of the tester illustrated in FIGURE 27 to permit the testing of each section of the tubing with liquid and simultaneously testing its joint with the next lower section with water;

FIGURES 29 through 35 are vertical partly sectional views, with some portions brken away, of a modified form of the tester for testing portions of a tubing with gas only;

FIGURE 36 is a schematic view showing the tester illustrated in FIGURES 29 through 35 in use testing a section of tubing and its connection with a next lower section;

FIGURE 37 is a schematic view showing the manner in which the tester of FIGURES 29 through 35 is used to test the joint or connection of the lower end of a stand of tubing with the top end of the next lower stand;

FIGURES 38 through 49 are vertical, partly sectional views, with some portions broken away, of another modified form of the tester having an anchor assembly connected to the lower end of its body and having a latch assembly connecting the top portion of the body to a lower main portion thereof;

FIGURE 50 is a perspective view of a dog carrier of the latch assembly of the tester illustrated in FIGURES 38 through 49;

FIGURE 51 is a vertical partly sectional view showing the means by which fluid under pressure is supplied to the tester illustrated in FIGURES 41 through 49;

FIGURE 52 is a fragmentary perspective view of anchor assembly of the tester illustrated in FIGURES 41 through 49;

FIGURE 53 is a perspective view of one of the latch dogs of the latch assembly of the tester illustrated in FIGURES 41 through 43;

FIGURES 54, 55 and 56 are schematic views illustrating the manner in which the tester of FIGURES 41 through 49 is moved in the tubing as a string of tubing is made up and run into the well;

FIGURE 57 is a schematic view illustrating the manner in which a modified form of the tester of FIGURES 41 through 49 may be used to test the joint or connection of adjacent stand of tubing;

FIGURE 58 is a vertical, partly sectional, view showing the upper end portion of another modified form of the tester;

FIGURE 59 is a vertical, partly sectional, view showing the lower end portion of the tester whose upper end portion is illustrated in FIGURE 58;

FIGURE 60 is a schematic view showing the tester illustrated in FIGURES 58 and 59 in use testing the joint or connection of adjacent sections of a tubing; and, FIGURE 61 is a schematic view showing modified form of the tester illustrated in FIGURES 58 and 59 in use testing a section of tubing as well as its joint or connection with the next lower section.

Referring now to FIGURES 1 through 27 of the drawings, the tubing tester 60 includes an elongate tubular mandrel or body 61 on which is mounted a top packer assembly 62, a middle packer assembly 63, and a bottom packer assembly 64 which are operable by a fluid, such as water under pressure, introducible into the tester through the passage 66 of the top body section 67. The enlarged upper portion of the passage 66 which opens to a vertical longitudinal slot 68 of the top body section, has threaded therein, as at 69, a tubular latch housing 70 of a quick disconnect assembly 71. The inner tubular section or prong 72 of the J-slot assembly has a reduced lower end portion 74 which is telescopical through a seal 75 held against downward movement in the top body section by an upwardly facing annular shoulders 76 of the top body section and against upward movement by the annular bottom end surface of the latch housing. The prong 72 has a pair of parallel flat sides 77 and 78 which may move between the retainer pins 79 and 80 of the latch housing when the flat surfaces are in alignment with the pins and a pair of flanges 81 and 82 which are movable beneath the pins when the prong is moved into alignment with a pair of diagonally opposed slots 82a and 82b. The prong is then rotated in a clockwise direction, FIGURE 16a, to move the parallel side surfaces 83a and 83b of the prong into alignment with the pins 79 and 80 and the prong is then raised upwardly until the flanges 81 and 82 engage the retainer pins. A lock nut 84 may be then screwed down on the prong to prevent downward movement of the prong and to hold the flanges of the prong in tight engagement with the retainer pins to prevent accidental disconnection of the prong from the latch housing. A fitting 89 of a flexible conduit or hose 90 through which fluid under pressure is transmitted from any suitable source to the testing device is threaded in the upper end of the prong.

The reduced top end portion 91 of the top body section has an aperture 92 to permit connection of a flexible hoist line 93 to the body.

The top packer section 95 of the body 61, on which the top packer assembly 62 is mounted, is connected to the lower end of the top body section by a spacer body section 96 and a bypass body section 97. The spacer body section has a reduced upper portion 98 which is threaded in the lower portion 99 of enlarged internal diameter of the top body section. A set screw 101 threaded in a suitable bore of the top body section is engageable with the spacer body section above the threaded connection of the two sections to prevent rotation between the two sections. An O-ring 103 disposed in the suitable annular recess in the spacer section seals between the top and spacer sections. The lower reduced portion 105 of the spacer section is similarly threaded in the upper portion 106 of the enlarged internal diameter of the bypass section and is held against rotation relative thereto by a set screw 107. An O-ring 108 seals between the bypass section and the spacer body section.

Downward movement of the top body section on the spacer section is limited by the engagement of its bottom end surface with the annular shoulder 109 of the spacer section and upward movement of the bypass section in the spacer section is limited by the engagement of its top end surface with the annular shoulder 110 of the spacer section.

The bypass body section has an internal flange 114 and upper and lower internal seal surfaces 115 and 116, respectively, above and below the internal flange. A tube 118 extends through the spacer body section and is provided at its upper end with internal annular recesses in which are disposed O-ring 119 engageable with the seal surface 120 of the top body section above the internal annular downwardly facing shoulder 121 thereof. The shoulder 121 is spaced from the annular top end surface 122 of the spacer section to provide an annular passage 124 therebetween to which opens the lower end of the passage 66 of the top body section. The lower end of the tube is similarly provided with a pair of external annular recesses in which are disposed O-rings 126 engageable with upper seal surface 115 of the bypass body section.

The external diameter of the tube 118 is smaller than the internal diameter of the spacer body section and the annular space 127 therebetween opens upwardly to the annular passage 124 at its top end and at its bottom to an annular passage 128 between the bottom annular end surface 129 of the spacebody section and the top annular shoulder 130 of the bypass body section. The bypass section has one or more vertical passages 131 which open to the annular passage 128 at their upper ends and at their bottom ends to an internal annular recess 132 of the bypass body section. The recess 132 opens to the annular space 133 between the top packer section 95 and a second tube 135 whose upper end extends into the bypass body section and is provided with external annular recesses in which are disposed O-rings 136 engageable with the lower seal surface 116 of the bypass body section 97 and its lower end, which extends into a bypass body section 140 secured to the lower end of the top packer section 95, similarly is provided with external annular recesses in which are disposed O-rings 141 which engage the upper seal surface 142 of the bypass body section 140. The packer body section 95 is threadedly secured as at 144 to the lower portion of the bypass body section 97 and is secured therein against rotation by a set screw 145. Upward movement of the packer body section into the bypass body section is limited by the engagement of its top annular end surface with the downwardly facing annular shoulder 146 of the bypass body section. An O-ring 147 seals between the top packer and bypass body sections.

The bypass body section 140 is substantially similar in structure to the bypass body section 97, its reduced upper end portion 148 being threaded on the lower reduced portion 149 of the top packer section and being held against rotation relative thereto by a set screw 150. An O-ring 151 disposed in an external annular recess of the top packer section seals between the bypass body section and the top packer section. The top packer section has a lateral bore 152 which is closed by a plug 153. The function of the bore will be described below.

The top packer assembly 62 includes a piston 155 disposed on the upper reduced portion 156 of the top packer section. The piston has a lower section 158 provided with an internal annular recess in which is disposed an O-ring 160 which seals between the lower piston section and the top packer section above a lateral port 162 of the top packer section and with a tubular skirt 163 telescoped over the portion 164 of the top packer section below the port. An O-ring 165 disposed in an external annular recess of the top packer section below its lateral port 162 seals between the skirt and the top packer section.

The top piston section 170, whose lower end is threadedly connected as at 171 to the lower piston section, has a plurality of lateral ports 172 which open to an annular chamber or passage 174 between the piston and the packer body section. A closure 175 in the chamber 174 includes an annular body 176 held in an upper position above the lateral ports 172 by the upper reduced portion 177 of the lower piston section. An O-ring 178 disposed in an internal annular recess of the closure body seals between the packer body section and the body and a resilient annular seal 179 is disposed about the reduced upper end portion 180 of the closure body and is bonded or otherwise secured in place therein. The upper annular lip portion 181 of the seal which extends upwardly of the upper end of the closure body is adapted to engage the downwardly facing internal shoulder 182 of the top piston section and the internal surface thereof below the annular shoulder 182 to cause the closure to close the upper end of the chamber 174 when the closure is moved upwardly to its closed position. The closure body is preferably provided with a plurality of external annular serrations or grooves 185 whose function will be described below.

The top packer assembly includes a plurality of resilient deformable annular packing elements 187, 188 and 189 disposed about the reduced upper end portion 190 of the top piston section above its upwardly facing annular shoulder 192 which limits downward movement of the packing elements on the upper piston section. The top packing element has a resilient bridging garter spring 193 embedded therein. A back-up ring 195 is slidably disposed on the upper end portion of the piston and is provided with an O-ring 196 in an internal annular recess of the back-up ring which seals between the back-up ring and the upper end portion of the piston.

The piston is biased downwardly to its lower inoperative position wherein its downward movement is arrested by the engagement of the bottom annular end surface of the skirt 163 with the upwardly facing annular shoulder 199 of the packer body section by a spring 201 disposed about the packer body section whose lower end portion engages the top end shoulder or surface 202 of the upper piston section and whose upper end portion engages the internal downwardly facing shoulder 204 of a tubular spring housing 206 whose lower end telescopes over the reduced lower end portion 190 of the top piston section. Upward movement of the spring housing is limited by the engagement of its top end surface with the bottom end surface of the bypass body section 97.

The spring housing has one or more ports 208 which open to the annular chamber or passage 209 between the spring retainer housing and the packer body section which has a plurality of circumferentially spaced longitudinal external bypass grooves 210 which communicate with the chamber 174 between the piston and the body. As a result, fluid flow may take place past the packing elements through the ports 172 of the piston, the passage 174, the bypass grooves 210, the passage 209 and the lateral ports 208 when the closure 175 is in its lower position relative to the piston illustrated in FIGURE 3.

It will be apparent that when the force of the pressure within the space 133 between the top packer body section 95 and the tube 135 is transmitted through the port 162 of the top packer body section and is exerted on the downwardly facing surfaces of the piston between the line of sealing engagement of the O-ring 160 with the top packer body section and of the O-ring 165 with the piston skirt 163, is sufficiently great to overcome the resistance of the spring 201 with the various frictional forces tending to resist upward movement of the piston on the body, the piston is moved upwardly compressing the packing elements between the piston shoulder 192 and the back-up ring shoulder 212. As the packing elements are compressed longitudinally they expand radially outwardly to seal between the piston and the flow conductor in which the tester is disposed. When such fluid pressure is relieved, the spring 201 is effective to move the piston downwardly thus permitting the packing elements to move resiliently back to their retracted inoperative positions illustrated in FIGURE 3. The cylindrical space 133 at its bottom end communicates with an annular passage 214 between the annular bottom end surface 215 of the top packer body section and the upwardly facing annular shoulder 216 of the bypass body section 140.

The middle packer body section 220 of the body, on which the middle packer assembly 63 is mounted, is connected to the lower end of the top packer body section by the bypass body section 140, a connector body section 221, a spacer body section 222 of a desired length to space the two packer assemblies a predetermined distance from one another, a connector body section 223 and a bypass body section 224. The connector body section 221 has a top reduced portion 227 threaded in the lower bottom end section 228 of the bypass body section 140. These two body sections are held against rotation relative to one another by a set screw 229 and an O-ring 230 seals therebetween. The reduced lower end portion 232 of the connector section 221 is threaded in the upper end 233 of the spacer body section 222, the two sections having a metal-to-metal seal, as at 235. The connector section 223 is similar to the connector section 221 having an upper portion 237 threaded in the lower end of the spacer body section 222, the two sections having metal-to-metal seal 238. The reduced lower end portion 239 of the connector section 223 is threaded in the upper portion 240 of the bypass body section 224, the two sections being held against rotation relative to one another by a set screw 241 and an O-ring 242 sealing therebetween. The lower end portion 245 of the bypass body section 224 is threaded on the reduced top end portion 246 of the middle packer body section 220 and is secured thereto against rotation by a set screw 247. An O-ring 248 seals between the two sections.

A tube 250 extends from the bypass body section 140 to the bypass body section 224, its upper end portion having a pair of O-rings 252 sealingly engaging the lower seal surface 254 of the bypass body section 140 and its lower end portion having a pair of O-rings 255 sealingly engaging the upper seal surface 256 of the bypass body section 224. The bypass body sections 140 and 224 have internal flanges 257 and 258 which limit longitudinal movement of the tube 250 in the body.

The longitudinal passage 260 of the bypass body section 140 opens at its upper end to the annular passage 214 between the annular shoulders 215 and 216 of the top packer body section 95 and bypass body section 140, respectively, and at its lower end to an annular passage 261 between the annular shoulders 263 and 264 of the body sections 140 and 221, respectively. The annular passage 261 in turn opens to the cylindrical space 265 between the tube 250 and the body sections 221, 222 and 223. The space 265 opens to an annular passage 267 between the bottom end surface 268 of the connector section 223 and the top shoulder 269 of the bypass body section 224. The longitudinal passage 270 of the bypass body section 224 opens at its upper end to the annular passage 267 and at its lower end to an annular passage 272 between its bottom annular shoulder 273 and the top annular end surface 274 of the middle packer body section 220.

An inner tube 275 extends through the middle packer body section 220, its upper end having a pair of O-rings 278 sealingly engaging the lower seal surface 279 of the bypass body section 224 and its lower end extending into a bypass body section 280 secured to the lower end of the middle packer body section and having O-rings 282 sealingly engaging the upper internal seal surface 283 of the bypass body section 280. The annular passage 272 opens to the cylindrical space 286 between the tube 275 and the middle packer body section.

The middle packer assembly 63 is similar to the top packer assembly 62 and includes a piston 287 having an upper cylindrical extension 288 which when it is in its upper position on the middle packer body section, FIGURE 6, is sealingly engaged by the upper and lower O-rings 284 and 290 and thus closes a lateral port 292 of the middle packer body section. The port opens to an external recess 294 of the middle packer body section between the two O-rings so that fluid from the space 286 may flow outwardly of the body between the top and middle packer assemblies 62 and 63, respectively, when the piston 287 is moved to a lower position on the packer and the piston extension 288 moves out of engagement with the upper O-rings 284.

The piston has an internal annular recess in which an O-ring 296 is disposed which seals between the piston and the middle packer body section below a lateral port 297 thereof which opens to an annular chamber or space 298 between the piston and the downwardly facing annular shoulder 299 of the middle packer body section. A plurality of packing elements 301, 302 and 303 are disposed on the lower reduced extension 304 of the piston below its downwardly facing annular shoulder 305 and above the upwardly facing annular shoulder 306 of a back-up between the piston and the downwardly facily annular recess of the back-up ring seals between the back-up ring and the piston. Downward movement of the back-up ring is limited by the engagement of its bottom end surface with the top end surface of a spring housing 310 whose downward movement in turn is limited by the engagement of its bottom end surface with a top end surface of the bypass body section 280. The lower end of the piston extension telescopes into the upper end of the spring housing and the piston is biased upwardly on the middle packer body section by a spring 312 disposed about the middle packer body section and within the spring housing 310. The upper end portion of the spring engages the bottom annular end surface 314 of the piston extension 304 and its lower end portion engages the internal upwardly facing annular shoulder 315 of the spring housing.

The bottom packing element 303 has an anti-extrusion garter spring 317 embedded therein.

It will be apparent that the force of fluid pressure within the annular space 286 between the inner tube 275 and the middle packer body section 220, communicated through the lateral port 297 to the chamber 298 exerted on the upwardly facing surface of the piston 287 between the line of the sealing engagement of its O-ring 296 with the middle packer body section and the line of sealing engagement of the O-ring 290 with the piston extension 288, when it exceeds the upward force exerted on the piston by the spring 312, causes the piston to move downwardly and the packing elements are compressed longitudinally between the shoulders 305 and 306 and thus are expanded radially outwardly.

The bottom packer body section 320 is connected to the middle packer body section 220 by the bypass body section 280, a connector section 321, a spacer body section 322, a connector section 323 and a bypass body section 324. The connector section 321 has its reduced upper end portion 326 threaded in the reduced lower end portion 327 of the bypass body section 280 and is held against rotation relative thereto by a set screw 328. An O-ring 329 disposed in an external annular recess of the connector section seals between the two sections. Upward telescoping movement of the connector section in the bypass body section is limited by the engagement of its upwardly facing annular shoulder 331 with the downwardly facing end surface 332 of the bypass body section so that the top end shoulder 334 of the connector section is spaced from the downwardly facing intermediate surface 334 of the bypass body section 280 to provide an annular passage 336 therebetween to which opens the longitudinal passage 337 of the bypass section. The upper end of the bypass passage opens to the space 286 through an annular passage 338 of the bypass body section. The lower end portion 341 of the middle packer body section is threaded in the upper end portion 342 of the bypass body section above an intermediate internal annular flange 344 thereof which limits upward movement of the bypass body section on the middle packer body section. A set screw 346 prevents rotation of the two sections relative to one another and an O-ring 347 seals therebetween.

The spacer body section 322 is threaded on the reduced lower end portion 348 of the connector section 321, the two sections having a metal-to-metal seal, as at 349. The lower end portion 351 of the spacer body section 322 is threaded on the upper reduced end portion 352 of the connector section 323, the two sections having a metal-to-metal seal, as at 353. The connector section 323 has a reduced lower end portion 355 threaded in the upper end portion 356 of the bypass body section 324 and is held against rotation relative thereto by a set screw 357. An O-ring 358 seals between the two sections. Downward movement of the connector section relative to the bypass section 324 is limited by the engagement of its downwardly facing annular shoulder 360 with the top annular end surface 361 of the bypass body section. The bypass body section 324 merely serves as a connecting member between the connector section 323 and the bottom packer body section 320 whose reduced upper end portion 362 is threaded in the lower end portion 363 of the bypass body section 324, the two sections being held against rotation by a set screw 364. An O-ring 365 seals between the two sections.

The bottom packer assembly 64 includes a piston 370 having a cylindrical upper extension 371 which telescopes over the reduced intermediate portion 372 of the bottom packer section. An external annular recess of the bottom packer section receives an O-ring 373 which seals between the extension and the bottom packer body section above a lateral port 374 thereof. The piston has an internal annular recess in which is disposed an O-ring 375 which seals between the piston and the bottom packer body section below the port 374. The piston and the bottom packer body section define an annular chamber or passage 376 between the downwardly facing annular shoulder 377 of the packer body section and the upwardly facing annular shoulder 378 of the piston. A plurality of packer elements 380, 381 and 382 are mounted on the reduced downwardly extending extension 383 of the piston, upward movement of the packing elements on the piston extension being limited by the downwardly facing annular shoulder 384 of the piston and downward movement thereof relative to the bottom packer body section being limited by the upwardly facing annular shoulder 386 of a back-up ring 387. The bottom packer element has an anti-extrusion garter spring 382a embedded therein. Downward movement of the back-up ring on the bottom packer body section in turn is limited by the engagement of its bottom annular end surface with the top end surface of a spring housing 390 whose downward movement on the bottom packer body section is limited by the engagement of its downwardly facing bottom annular end surface 388 with the upwardly facing annular end shoulder 389 of a spring housing 390. Downward movement of the spring housing on the packer body is limited by the engagement of its shoulder 392 with the upwardly facing top end surface 393 of the bottom body section 394 into whose upper end portion 395 is threaded the lower end portion 396 of the bottom packer body section. Rotation of the bottom packer section relative to the bottom body section 394 is prevented by a set screw 397 and an O-ring 398 seals therebetween. The piston 370 is biased upwardly by a spring 400 whose top end portion engages the annular bottom end surface 401 of the piston 370 and whose bottom end portion engages the upwardly facing internal annular shoulder 403 of the spring housing.

The space 286 communicates with the chamber 376 through the annular passage 338 of the bypass body section 280 and its longitudinal passage 337, the annular passage 336, the central bores or passages 405, 406, 407, 408 and 409 of the connector section 321, the spacer body section 322, connector section 323, the bypass body section 324 and the bottom packer body section, respectively, and the port 374. The lower end of the central bore 411 of the bottom body section 394 is closed by a plug 412 threaded in the reduced lower end portion 413 of its bore.

It will be apparent that when the force of the fluid pressure exerted on the upwardly facing area of the piston 370 between the line of sealing engagement of the O-ring 375 with the bottom packer body section 320 and the line of sealing engagement of the O-ring 373 with the piston extension 371 exceeds the upward force exerted on the piston by the spring 400, the piston moves downwardly and the packing elements are compressed longitudinally between the piston shoulder 384 and a back-up ring shoulder 386 and are expanded radially outwardly.

It will now be apparent that the tester body together with the internal tubes and bypass body sections thereof provides a passage A through which the fluid under pressure from the flexible conduit 90 is transmitted to the pistons of the three packer assemblies to cause them to compress longitudinally and expand radially the packing elements thereof and that when the middle piston moves a predetermined distance wherein its extension 288 moves out of engagement with the O-ring 284, the port 292 is opened to permit fluid to flow from the passage A to the exterior of the tester body between the top and middle packer assemblies.

The internal tubes and the packer body sections also provide a passage B to whose upper end fluid under pressure is introduced from the flexible conduit 90a through a quick disconnect assembly 71a, which is identical to the quick disconnect assembly 71, and accordingly, its components have been provided with the same reference numerals to which the subscript a has been added, as the corresponding elements of the quick disconnect assembly 71. The latch housing 70a is threaded in the upper enlarged portion 415 of a passage 416 of the top body section 67 which opens through a downwardly and inwardly inclined portion 417 thereof to the central passage or bore 418 of the top body section above the top of the inner tube 118. The central passage B includes the central passages of the tube 118, the bypass body section 97, the tube 135, the bypass body section 140, the tube 250, the bypass body section 224, the tube 275 and the upwardly opening passage 420 of the bypass body section 280 which is closed at its bottom end and which opens to the exterior thereof through a lateral port 421.

It will be apparent that when fluid under pressure is introduced into the flexible conduit 90a, such fluid flows to the exterior of the tester body between the bottom and middle packer assemblies.

As illustrated in FIGURE 27, the tester device 60 is used to test for leaks in stands S of a string of tubing as they are made up or connected at the surface and lowered into the well. Each stand of tubing may include three sections s1, s2 and s3, coupling collars C1 and C2 which connect the sections and a top coupling collar C3 by means of which the upper end of each stand may be connected to the bottom end of the next higher stand. The tester 60 may be employed to test each stand of tubing between its top and bottom coupling collars C3 and C1 with a liquid, such as water, under pressure and the joint or connection of the lower end of the stand with the coupling collar C3a of the preceding stand with a gas under pressure, such as air. The tester 60 is lowered into the upper end of the tubing while it is supported by the usual slips 430 of the surface well equipment after the lower end of the stand has been connected to the upper end of the preceding stand and lowered into the well. When the tester is in a position illustrated in FIGURE 27 the top packer assembly 62 is immediately below the upper end of the top section s3 of the top stand of tubing, the middle packer assembly 63 is in the section s1 above the joint or connection of the top stand S with the next lower stand Sa by the collar C3a and the bottom packer assembly 64 is in the top section s3a of the immediately lower stand of tubing. The passage A of the body is filled with water to the level of the ports 292 of the middle packer body section 220. The conduit 90 is then connected through suitable control or valve means to a suitable source of water under pressure and water under pressure is thus introduced into the passage A. As the water under pressure is introduced into the upper end of the passage A, the force thereof exerted on the pistons of the packer assemblies moves the pistons to compress their packing elements and cause them to expand radially to seal between the tester body and the tubing as illustrated in FIGURES 19, 22, and 25. As the piston 287 of the middle packer assembly moves its packing elements into sealing engagement with the well casing, as illustrated in FIGURE 22, and its extension 288 moves out of sealing engagement with the O-ring 284, the water, and any air which has been trapped in the passage A above the port 292, then flows outwardly into the annulus between the tester body and the tubing above the packing elements of the middle packer assembly and flows upwardly therein. As the water flows outwardly through the port 292 into the annulus between the top and middle packer assemblies, whose packing elements are now expanded and in sealing engagement with the casing, air in the annulus above the packing elements of the middle packer assembly flows past the packing elements of the top packer assembly through the ports 172, the cylindrical passage 174, the bypass grooves 210, and the passage 209 and the ports 208 of the spring housing section 206. The force of the air, exerted on the closure 175 as it flows therepast is not great enough to move the closure member upwardly due to the low viscosity of the air. As the water fills the annulus above the middle packer assembly and reaches the level of the ports 172, only a very small amount of air above the ports 172 remains in the annulus and, as the water begins to flow upwardly through the chamber 174, the increased upward force exerted on the closure body 176, due to the greater viscosity of the water as compared to that of air, moves the closure 175 upwardly and its seal ring 179 then engages the piston shoulder 182 and the internal surface of the piston immediately therebelow to prevent further flow past the packing elements of the upper packing assembly. The grooves 185 of the closure body by increasing turbulence of the water flowing through the passage 174 increase the upward force exerted on the closure member by the water. The pressure in the passage and in the tubing between the top and middle packer assemblies is then increased to a predetermined desired value, the flexible conduit 90 is disconnected from the source of fluid under pressure by suitable control valves, and appropriate instruments, such as pressure gauges, of the control means connected to the flexible conduit 90 indicate if the pressure of the fluid decreases during a predetermined period of time which would indicate a leak in the tubing between the top and middle packer assemblies.

As soon as the middle and bottom packer assemblies are set, gas, such as air, under pressure is introduced through suitable control means to the conduit 90a, and thus to the passage B of the tester, and through the lateral port 421 to the exterior of the tester body and into tubing between the middle and bottom packers which are, of course, disposed on opposite sides of the joint provided by the coupling C3a which connects the two stands. When a predetermined pressure of gas has been attained, the conduit 90a is disconnected from such source of pressure by suitable control valve means. Appropriate means such as pressure gauges of the control means then indicate the pressure in the conduit 90a, and therefore in the passage B and in the tubing between the packer assemblies 63 and 64. If an opening exists in the tubing between the middle and bottom packers, the pressure decreases as the gas leaks to the exterior of the tubing.

When the test is completed, the pressure is reduced both in the conduits 90 and 90a and thus in the passages A and B, the springs of the piston assemblies, as well as the resilient force of the packing elements of the packer assemblies, moves the pistons back to their inoperative positions. As the piston assembly 155 moves down, the closure 175 is also moved down on the packer section 95 due to its engagement with the shoulder 182. The closure may not move back to the lowermost position illustrated in FIGURE 2 due to the frictional engagement of the O-ring 178 with the packer body section. However, the next time the piston assembly 155 moves upwardly, the closure will remain stationary due to this frictional engagement and will permit flow of air therepast until the water enters into the chamber 174 through the port 172. The water above the middle packer 63 flows downwardly through the tubing into the well as the packing element thereof retracts. If the joint or stand is found to have leaks, the tubing may be pulled up and the stand S disconnected from the stand Sa for inspection and repair.

If such stand S of tubing and the joint or connection of its lower end with the top end of the previous tubing stand Sa have been tested for leaks and found to be satisfactory, the tester is moved upwardly by suitable hoist means out of the tubing, the lower end of another stand is then connected as to the coupling C3, the tubing lowered a stand length into the well, the tester is again moved downwardly into such next uppermost stand and the above sequence of operations is repeated to test the connection of such next stand with the stand S at the coupling C3 with gas and the remainder of the stand with water.

If it is desired, as illustrated in FIGURE 28, to test each section of the string of tubing with water and also the joint or coupling by which it is connected to the next lower tubing section with gas as the string of tubing is made up initially, the spacing between the middle and top packer assemblies of the tester 60a is decreased by using a spacer body section 222 and an inner tube 250 of much shorter length than that illustrated in FIGURES 4 and 5. Alternatively, the tube 250 and the sections of the body between the top packer body section 95 and the bypass body section 224 may be removed and the body section 224 connected directly to the top packer body section. In this case, the lower end of the tube 135 would telescope into the upper end of the bypass body section 224. In either case, the distance between the packer assemblies 62 and 63 will be somewhat less than the length of the sections of the tubing. The tester 60a will then be operated in exactly the same manner as described above in connection with the tester 60. Each tubing section will thus be tested with water under pressure and each joint or connection of two sections will be tested with gas under pressure.

It will thus be apparent that the tester 60 may be easily modified or adjusted to simultaneously test tubing joints and tubing sections with two different fluids, or with the fluids under different pressures, and that the spacing between the top and middle packers may be easily adjusted to cause different lengths or spans of the string of tubing, whether each such span constitutes one or more sections of the string of tubing, to be tested by fluid under pressure introduced into the annulus between the top and middle packer and between the tester body and the tubing.

The tester 60 may be easily converted into a tester 500, FIGURES 29 through 36, used to test tubing joints or sections with gas only, by removing the sections of the body between the bypass body section 140 and the connector section 321 and then connecting the connector section 321 directly to the bypass body section 140. The tube 250 of the tester 60 is then, of course, replaced by a shorter tube 502 of appropriate length whose upper end portion telescopes into the bypass body section 140 and is provided with O-rings 503 which sealingly engage the lower seal surface 254 thereof and whose lower end section telescopes into the bypass mandrel section 324 and has O-rings 504 which sealingly engage the upper seal surface 505 thereof. A second inner tube 507 is positioned to extend through the bottom packer body section 320, its top end portion extending into the bypass body section 324 and being provided with O-rings 509 which sealingly engage the lower seal surface 510 of the bypass body section and its lower end portion extending into the bottom body section 395 and having O-rings 512 which sealingly engage the seal surface 513 of the bottom body section. The plug 412 shown in FIGURE 10 is removed from the bottom body section. The plug 153 shown in FIGURE 4 is also removed from the bore 152 of the top packer body section 95 and replaced by a bean 515 which has a restricted orifice 516 for a purpose to be described below.

The closure 175 is held in its upper closed position by a spring 517 whose top end portion engages the annular bottom end shoulder of the closure body 176 and whose bottom end portion engages the upwardly facing annular shoulder 518 of the bottom piston section 158 of the piston 155 of the top packer assembly 62. Gas under pressure is supplied to the top end of the passage A from a suitable source through the conduit 90 and the quick disconnect assembly 71 and is transmitted through the passage A to the pistons of the top and bottom packer assemblies, the passage A now including the longitudinal passage 520 of the bypass body section 324 and the annular space 521 between the tube 507 and the bottom packer body section. The lower end of the passage A of the tester is, of course, closed by the O-rings 512 which seal between the lower end of the tube 507 and the bottom body section above its passage 413. The passage B which now opens at the upper end of the body to the exterior extends through the inner tubes and the body and opens at its lower end to the exterior of the body through the now open bore lower end portion 413 of the bore of the bottom body section 394.

In use, the spacing or distance between the top and bottom packer assemblies is predetermined by employing a spacer body section 322 and tube 502 of appropriate lengths. If the tester is to be used to test each section S of a string of tubing and its joint or connection with the next lower section by a coupling collar, as illustrated in FIGURE 36, the tester is lowered into the string of tubing while the last connected section, such as the section s3, is being supported by the slips 430 of the surface well equipment to position wherein the top packer assembly 62 is located about the level of or just below the slips 430 and the bottom packer assembly 64 is located in the next lowermost section s2 of tubing below the joint or connection of the two sections. Gas under pressure is then introduced from a suitable source through the suitable control valves, the conduit 90 and the quick disconnect assembly 71 into the upper end of the passage A and its pressure is immediately exerted on the pistons of the top and bottom packing assemblies which compress the packing elements of these two assemblies and expand them radially outwardly into sealing engagement with the tubing sections s3 and s2. Gas from the passage A also immediately begins to flow outwardly through the orifice 516 of the bean 515 but since this orifice is restricted, the pistons are moved to set the packing elements of the two assemblies before the pressure in the annulus between the tester body and the packing elements of the two packer assemblies equalizes with the pressure within the passage A. Once the packing elements move into sealing engagement with the sections of the tubing, the pressure above the upper packer assembly and below the lower packer assembly is, of course, lower than the pressure in the annulus between the two packer assemblies so that the pressure differential across the two packer assemblies and pistons tends to hold the piston and the packer assemblies in their operative positions wherein the packing elements seal with the tubing sections. The pressure in the annulus is then raised to a predetermined value, the conduit 90 disconnected from the source of pressure by suitable control valves and the pressure within the conduit 90, and therefore, within the passage A and the annulus between the packers, is indicated by a suitable pressure gauge connected to the conduit 90. If any openings are present in the string of tubing between the two packer assemblies, the pressure indicated by the gauge will drop as the gas leaks from the tubing. Should a failure of the lower packing assembly occur, either due to wear, mishandling, or the like, the gas would tend to flow downwardly through the tubing past the bottom packer assembly and through the lower open end of the tubing into the annulus between the tubing and the casing of the well and would cause a blowout of equipment and fluids, if the passage B were closed. Since the lower end 413 of the passage B is open, the plug 412 having been removed, should the bottom packer assembly fail, the testing gas will flow to the atmosphere through the passage B and will not tend to blow out upwardly through the annulus between the casing and the tubing.

If desired, as illustrated in FIGURE 37, the tester 500A, which may be identical to the tester 500 except that its spacer body section 322 and tube 502 are shorter than those of the tester 500 may be used to test only the juncture between two connected sections of the tubing. As illustrated in FIGURE 37, the tester 500A is used to test a joint at the collar C3a between the top portion of a stand Sa of tubing and a lower end of a strand S of the tubing.

It will be apparent that such testing with compressed gas is preferably performed while the portion of the string of tubing being tested with compressed gas is in the well to preclude damage to surface equipment and injury to personnel should the portion of the tubing being tested with gas rupture or fail since the relatively large volume of compressed gas contains a great amount of energy which would be released as the gas expanded and would tend to move broken portions of the tubing outwardly with great velocity and force.

The tester 60 may be easily converted into the tester 600 illustrated in FIGURES 38 through 56 by connecting a latch assembly 601 to the lower end of the connector section 96 and connecting a latch housing 602 to the upper end of the bypass body section 97, and connecting an anchoring assembly 604 to the lower end of the middle packer body section 220. The inner tubes and the portions of the body below the middle packer body section and the bottom packer assembly mounted thereon are omitted.

The latch assembly includes a mandrel 605 having a top mandrel section 606 in whose upwardly opening top bore 607 is telescoped the lower reduced end portion 105 of the connector body section 96 and secured against rotation therein by a set screw 608. The top mandrel section 606 also has a downwardly opening bore 610 in which is threaded the upper reduced end portion 612 of the middle mandrel section 613, the two mandrel sections being secured against rotation relative to one another by a set screw 614. An O-ring 615 disposed in an external annular recess of the middle mandrel section seals between the two sections. The bottom mandrel section 617 has a top reduced portion 618 threaded in the lower end of the middle section, the two sections having a metal-to-metal seal therebetween as at 619.

The bottom mandrel section has an intermediate external annular flange 620 whose lower annular upwardly and outwardly inclined shoulder 621 is adapted to engage the upwardly facing internal annular shoulder 622 of the latch housing 602. The bottom mandrel section has a reduced lower end portion 624 which is telescoped in the bore 625 of the latch housing, the connection being made fluid tight by a pair of O-rings 626 disposed in external annular recesses of the portion 624. The lower reduced end portion 627 of the latch housing is threaded in the upper end of the bypass body section 97 and is secured thereto against rotation by a set screw 628 and an O-ring 629 seals between the latch housing and the body bypass section 97. The latch housing has a plurality of lateral ports 630 which open to the interior of the latch housing as shown below the downwardly facing shoulder 631 of the latch mandrel to permit entry and escape of fluids from the latch housing as the latch mandrel is telescoped into or removed upwardly from the latch housing. The top mandrel section has a transverse bore 632 and a vertical passage 633 which opens at its upper end to the internal annular recess 634 of the top connector section at the middle of the transverse bore and at its lower end to the central passage 635 of the latch mandrel.

A dog carrier 636 is slidably mounted on the lower end portion 637 of reduced external diameter of the middle mandrel section and is biased downwardly by a spring 638 whose top end portion engages the annular downwardly facing shoulder 639 of the middle mandrel section and whose bottom end portion engages the annular top end surface 640 of the dog carrier. The tubular dog carrier is disposed between the latch mandrel and a retainer sleeve 641 whose upper end is threaded on the middle mandrel section above its shoulder 639 and held against rotation thereon by a set screw 642. The retainer sleeve has a pair of opposed longitudinal slots or windows 643 through which access may be had to the dog carrier. The dog carrier has external serrations 644 to facilitate its manipulation. The dog carrier may be moved upwardly on the latch mandrel against the resistance of the spring 638 by grasping its outer opposite surfaces which are exposed through the slots 643.

The retainer sleeve has an internal annular flange 645 at its lower end whose top annular shoulder or surface 646 is engageable by the downwardly facing shoulders 647 of the external upper bosses 648 of the dogs 649 supported by the dog carrier. The shanks 650 of the dogs extend through external longitudinal outwardly and downwardly opening slots 651 of the dog carrier and have inner bosses 652 which extend inwardly through the slots to positions wherein their downwardly facing shoulders 653 which are engageable with the upwardly facing annular shoulder 654 of an internal annular flange 657 of the dog carrier to limit downward movement of the dogs relative to the dog carrier. The lower ends of the dogs have external bosses 658 which are receivable in an internal annular recess 659 of the latch housing defined at its lower end by the shoulder 622 thereof and at its upper end by an upwardly and inwardly beveled or inclined annular shoulder or cam surface 660. The bosses have upper and lower outwardly convergent cam shoulders 661 and 662, respectively. The dogs fit loosely within the slots of the dog carrier so that they may pivot about horizontal axes adjacent their upper ends.

When the dogs are in their lower operative positions on the latch mandrel illustrated in FIGURE 41, their downward movement on the latch mandrel is limited by the engagement of their bottom end surfaces with the annular upwardly facing stop shoulder 666 of the bottom mandrel section and the inward movement of their lower ends is limited by the external annular locking surface 667 thereof. When the dog carrier and dogs are in their lower positions on the mandrel, the dog bosses 658 extend outwardly into the housing recess 659 below the top shoulder 660 of the latch housing so that upward movement of the latch mandrel relative to the latch housing is limited by the engagement of the top shoulders 661 of the dog bosses 658 with the shoulder 660.

It will be apparent that when it is desired to remove the latch mandrel from the latch housing, the latch mandrel is moved downwardly in the latch housing until its downward movement is stopped by the engagement of its shoulder 621 with the latch housing shoulder 622, the dog carrier is then moved upwardly on the latch mandrel against the resistance of the spring 638 and, as the bottom ends of the dogs move into alignment with the portion 668 of the middle mandrel section above the locking surface 667, the lower ends of the dogs are freed to move inwardly. As the latch mandrel is then moved further upwardly and the top shoulders of the dog bosses 658 engage the latch housing shoulder 660, the camming engagement therebetween moves the lower ends of the dogs inwardly and out of engagement with the shoulder 660 so that the latch mandrel may then be moved upwardly and removed from the latch housing.

As the dog carrier is lifted on the mandrel, the upwardly facing internal cam surfaces 655 near the upper ends of the dogs engage the lower end of the middle mandrel section to pivot the upper ends of the dogs outwardly and their lower ends inwardly to ensure that the dog bosses 658 are disengaged from the shoulder 660.

The anchor assembly 604 includes a top member 670 having an upwardly opening bore 671 in whose upper portion of enlarged internal diameter is threaded the lower end of the midddle packer body section 220, the two sections being held against rotation by a set screw 672. An O-ring 673 in an internal annular recess of the top anchor member seals between the two sections. The reduced lower end portion 674 of the top anchor member is telescoped in the upwardly opening bore 675 of the middle expander member 676 of the anchor assembly and has an external annular flange 677 at its bottom end whose upwardly facing annular shoulder 679 is engageable with the bottom annular end surface of a split ring 680 which limits its upward movement relative to the middle expander member. Downward movement of the split ring in the bore 675 is limited by the upwardly facing annular shoulder 681 of the expander member and its upward movement by the engagement of its top end shoulder with the bottom end surface of a tubular nut or retainer 682 threaded in the upper end of the bore. The retainer is held against rotation by a set screw 683. The expander member has a lateral port 684 which opens to the bore 675 adjacent its lower end to permit flow of fluids therefrom during downward movement of the top member relative to the expander member and to permit flow of fluids into the bore during upward movement of the top member relative to the expander member. It will be apparent that upward jars may be imparted to the expander member by means of the top member since the flange and the split ring in effect provide a lost motion connection between the top and expander anchor members. Downward movement of the top anchor member relative to the expander member is limited by the engagement of the annular shoulder 685 of the top member with top end surface of the retainer 682. The expander member is also rotatable about its longitudinal axis relative to the top anchor member.

The expander member has frusto-conical downwardly tapered or beveled expander surface 686 which is engageable with the internal upwardly and outwardly inclined or beveled cam surfaces 687 at the upper ends of the resilient collet fingers 688 of a collet 690, threaded on the upper end of the bottom anchor member 694, when the expander member is moved downwardly relative to the bottom member. The collet fingers also have top internal outwardly and upwardly inclined cam shoulders 691 which are engageable with the annular cam shoulder 692 of the expander member to help guide the expander surface between the upper ends of the collet fingers in the event that the collet fingers are not in proper longitudinal alignment with the expander member as the expander member is moved downwardly, relative to the bottom anchor member.

The reduced lower end portion 693 of the expander member is slidably telescoped in the tubular bottom anchor member 694 which has a J-slot 695 into which extends the head 696 of a screw 697 threaded in a suitable lateral bore of the lower end portion 693. The J-slot is defined at its upper end by a downwardly facing arcuate top cam surface 698, which curves downwardly from the vertical side surface 699 defining one side of the vertical leg portion 700 of the J-slot, to an upwardly opening recess 701 of substantially the same radius of curvature as the screw head 696. The top cam surface extends over an upwardly facing bottom cam surface 702 which extends laterally from the recess 701 to the vertical side surface 703 defining the other side of the vertical leg.

It will be apparent that if a force resists upward movement of the bottom anchor member and an upward force is exerted on the expander member, the camming engagement between the head of the screw 696 with the sloping top surface 698 of the bottom anchor member tends to rotate the expander member to the right, as seen in FIGURE 52, to cause the screw head to be moved to position above the top end of the vertical leg portion 700 of the J-slot. If a downward movement is thereafter applied to the expander member while the bottom member is held against downward movement, the screw head will move downwardly through the vertical leg portion to permit the expander surface 686 thereof to move into engagement with the cam surfaces 687 of the collet fingers and move the upper ends of the collet fingers outwardly. Should the screw head not be in perfect vertical alignment with the upper end of the vertical leg portion 700 upon the initiation of downward movement of the expander relative to the bottom anchor member, the camming engagement of the screw head with the surface 702 will tend to rotate the expander member to the right, as seen in FIGURE 52, and cause the screw head to enter into the vertical leg portion 700. If it is desired, as when first introducing the anchor assembly into the upper end of a section of tubing, that the expander member be held in an upper position illustrated in FIGURES 52, 48 and 49 to prevent engagement of its expander surface 686 with the cam surface 687 of the collet fingers, the expander member is rotated to the position illustrated in FIGURE 52 wherein its screw head 696 is in the recess 701 and if an upward force resists downward movement of the bottom member, as due to the engagement of the external surfaces 710 of the external bosses 711 at the upper ends of the collet fingers with the internal surfaces of a string of tubing, the bottom member will be moved downwardly due to the engagement of the screw head with the surfaces defining the recess 701 with the collet fingers held below the expander surface and thus free to flex inwardly.

The outer surfaces 710 of the collet finger bosses are adapted to engage the internal surfaces of a flow conductor, such as the sections of the string of tubing. The bosses have outwardly convergent top and bottom cam shoulders 714 and 715, respectively, to facilitate the movement of the bosses past upwardly and downwardly facing internal obstructions, respectively, of a flow conductor, such as a string of tubing, during the movement of the anchor assembly therethrough.

Referring now particularly to FIGURES 54 through 56 of the drawings, if the tester 600 is to be used to test relatively long stands S of tubing and the joint or connection of each stand with the next lowermost stand, the spacer body section 222 is made of appropriate length so that when the tester 600 is positioned in the string of tubing, the bottom packer 63 is positioned below the coupling collar by which the uppermost stand is secured to the next lowermost stand of the tubing and the packer assembly 62 is positioned in the top section of such uppermost stand immediately below its collar C3 as illustrated in FIGURE 55. Assuming now that the stand Sa, FIGURE 54, and its joint with the next lowermost stand has been tested, the latch assembly 601 has been disconnected from the latch housing 602 and the upper portion R of the tester, which includes the top body section 67, the connector section 96, and the latch assembly 601, has been removed upwardly from the tubing leaving the portion of the tester, which includes the latch housing, anchored by means of the anchoring assembly to such next lowermost stand, the stand S has been connected to the top end of the stand Sa by means of the coupling collar C3a, and the string of tubing has been lowered to the position illustrated in FIGURE 54 and is supported by the slips 430 of the surface equipment. The upper portion R of the tester is then lowered into the stand S until the lower reduced end portion of the latch mandrel and the dogs 649 are telescoped in the latch housing in the manner described above, and then limit downward movement of the latch assembly 601 relative to the latch housing 602. The tester is then raised upwardly by means of the line or flexible member 93 from the position illustrated in FIGURE 54. As the upper portion of the tester is moved upwardly the bottom anchor assembly 694 and the collet 690 tend to remain stationary due to the frictional engagement of the collet finger bosses 710 with the tubing. The top anchor member 670 moves upwardly relative to the expander member until its flange 677 engages the retainer ring 680 whereupon an upward movement is imparted to the expander member 676. The expander member is free to move upwardly since its screw head 696 is positioned in the vertical leg portion 700 of the J-slot of the bottom anchor member 694. If the frictional engagement between the expander surface 686 of the expander member with the cam surfaces 687 of the collet fingers is great, upward jars may be imparted to the expander member, due to the lost motion connection between the top and expander members, to free the expander member for upward movement relative to the collet. As the tester is then raised upwardly in the tubing, the expander surface 686 moves out of engagement with the collet fingers to free them for movement inwardly to permit upward movement of the tester. As the tester is moved upwardly, the expander member moves upwardly relative to the bottom anchor member and the collet until the screw head 696 engages the surface 698. The expander surface 686 is now above the collet fingers as illustrated in FIGURE 48 and as the upward movement of the tester is continued the collet fingers are free to flex inwardly to permit upward movement of the bottom anchor member.

The tester after it reaches a position above its position illustrated in FIGURE 55 is lowered. As it is lowered the bottom anchor member remains stationary being held against downward movement by the frictional engagement of the collet finger bosses with the internal surfaces of the top section s3a of the top section of the stand Sa. The expander member thus moves downwardly relative to the bottom anchor member and the collet and its expander surface 686 engages the collet finger cam surfaces 687 and tends to move the collet fingers outwardly to cause their bosses to firmly engage the internal surfaces of the tubing section s3a. Downward movement of the tester continues until the shoulder 685 of the top anchor member engages the top surface of the retainer 682 whereupon the weight of the tester, as well as the top and expander members, exert a force against the collet fingers holding them in their expanded gripping positions anchoring the tester against downward movement. The top connector section 606 is now positioned above the top end of the stand S so that a prong or fitting 720 connected to the flexible conduit 90 is insertable in its transverse bore 632. When the fitting is in the position illustrated in FIGURE 51 its O-rings 721 and 722 are disposed on opposite sides of the annular recess 634 and its further movement through the transverse bore is arrested by the engagement of its shoulder 723 with the top connector section. The O-rings 721 and 722 seal between the fitting and the top connector section on opposite sides of the annular recess 634 and the vertical bore 725 of the fitting is thus in communication with the recess 634 and therefore with the vertical passage 633 of the top connector section. The longitudinal bore 726 of the fitting opens at its outer end to the vertical bore 725.

Water under pressure is then introduced into the conduit 90 and is transmitted through the fitting and the longitudinal passage of the tester body to the pistons of the packer assemblies 62 and 63 which compress the packing elements and move them into sealing engagement with the string of tubing. As the sealing elements of the packer assembly 63 are expanded into sealing engagement with the sections s3a of the tubing, the extension 288 of its piston 287 moves out of sealing engagement with the O-ring 284 and the water flows through the ports 292 into the annulus between the tester body and the string of tubing between the two packer assemblies. The air trapped inside the annulus then flows upwardly past the upper packer assembly 62 through the piston ports 172, the passage 174, the bypass grooves 210 and the ports 208. When the water reaches the level of the ports 172 and begins to flow upwardly through the passage 174 past the closure 175, the closure is moved upwardly to close the passage 174. When a predetermined pressure is attained in the conduit 90, the conduit 90 is disconnected from the source of liquid under pressure by suitable control valve means. The pressure in the conduit 90, and therefore in the annulus between the tester body and the stand of tubing between the two packer assemblies, is indicated by suitable pressure indicator means or gauges. If an opening is present in the portion of the tubing between the packer assemblies 62 and 63, the liquid will leak out through the opening and the pressure so indicated will drop indicating that the stand must be repaired. If no leak is present, the pressure in the conduit 90 is relieved by the control means, the packing piston assemblies move to their inoperative positions due to the springs thereof which move their pistons to an inoperative position and the water present in the tubing above the packer 63 flows downwardly therepast into the well.

The prong or fitting 720 is removed from the transverse passage, the latch assembly is disconnected from the latch housing in the manner previously described, and the top portion of the tester is moved upwardly and out of the tubing. Another stand Sb is then connected to the coupling collar C3 of the stand S, the tubing lowered further into the well to the position illustrated in FIGURE 56, wherein the stand Sb is held by the slips 430 of the surface equipment, and the top portion R of the tester is again lowered into the tubing until the latch mandrel again telescopes into the latch housing and the tester is again moved upwardly to position to test the stand Sb and its joint or connection with stand S at the coupling collar C3.

It will be apparent that due to provision of the anchoring and the latch assemblies the tester does not need to be lifted completely from the tubing each time another stand of the tubing has to be connected thereto which results in considerable saving of time and labor since the stands may be of considerable length, e.g., more than ninety (90) feet long.

It will be apparent that the anchor assembly prevents downward movement of the tester in the tubing but allows its upward movement therein when the screw head 696 is in alignment with or in the vertical leg portion 700 of the J-slot. If it is found necessary, as for example, at the time of initial insertion of the tester into the tubing, to move the tester downwardly through the tubing, the expander member is rotated to the left as seen in FIGURE 52, to position the screw head 696 in the recess 701 whereupon the anchoring assembly will be rendered inoperative to prevent downward movement of the tester through the tubing, the collet fingers now being held in position below the expander surface 686 and against upward movement relative thereto so that the upper ends of the collet fingers will be free to flex inwardly as the tester is moved downwardly through the tubing. When it is again desired to render the anchoring assembly operative to prevent downward movement of the tester in the tubing, the tester body is moved upwardly and the camming engagement of the screw head 696 with the top cam surface 698 will cause the expander member to rotate to the right until the screw head 696 is again above the vertical leg portion of the J-slot.

The tester 60 may also be easily converted to the tester 800, FIGURES 58, 59 and 60, by removing the latch housing 70a from the passage 416, closing its upper end by means of a plug 801, removing the inner tubes, disconnecting the bypass body section 280 from the middle packer body section 220 and then connecting the bottom body section 394 directly on the lower end of the packer body section 220. If the spacer body section 322 is of relatively short length, the distance between the packers 62 and 63 will be relatively short so that the tester may be used to test only the juncture between two sections such as at the coupling collar C2 in substantially the same manner as described in connection with the tester 600 while the tester is held suspended by means of the flexible line or cable 93 by introducing liquid under pressure into the tester through the conduit 90 which will first cause the packing elements of the packer assembly 62 to move into sealing engagement with the sections of the tubing connected by the coupling collar C2, the ports 292 are placed in communication with the annulus between the tubing and the tester body, and, as the water flows into the annulus the air is displaced upwardly past the packing assembly 62 until the water reaches the ports 172 and moves the closure member 175 back to its closed position.

The tester 800A used to test a whole section of the tubing as well as the joint connecting it to the next lowermost section, as illustrated in FIGURE 61, is identical to the tester 800 except that its spacer body section is of greater length.

It will now be seen that a new and improved tester has been illustrated and described which may be easily modified to test long or short portions of a string of tubing with either liquid or gas, or to test different portions thereof simultaneously with liquid and gas.

It will also be seen that the tester may be removed from the tubing prior to the connection of each succeeding stand or section thereof to the next lower stand or section, or may be converted to a tester illustrated in FIGURES 41 through 49, whose main long bottom portion has anchor means to prevent its downward movement in the tubing and whose short upper portion is releasably securable to the main portion by a latch assembly or means whereby only the short upper portion has to be removed from the tubing prior to the connection of each additional section or stand to the strip of tubing.

It will further be seen that while the various forms of the tester have been illustrated and described in use as being positioned in the tubing below the slips of the surface equipment, if desired, the testers could be positioned in a portion of the tubing to be tested above the slips so that the tubing sections would be lowered into the casing after being tested, such testing of the tubing above the slip sometimes being desired or necessary if the casing is filled with a weighted fluid, such as drilling mud, which would tend to prevent escape of gas or water from the portion of the tubing being tested through apertures or leaks present therein.

The foregoing description of the invention is explanatory only, and changes in the details of the construction illustrated may be made by those skilled in the art, within the scope of the appended claims, without departing from the spirit of the invention.

What is desired and claimed to be secured by Letters Patent is:

1. A tester including: an elongate body; a plurality of packer assemblies mounted in longitudinally spaced relation on said body, each of packer assemblies including external seal means and piston means movable longitudinally on said body for radially expanding said seal means, said body having means providing a first passage and first port means for transmitting fluid pressure from said passage to said pistons to move said piston means longitudinally on said body from inoperative positions wherein said seal means are in retracted positions to operative positions wherein said seal means are in expanded positions; means biasing said piston means to inoperative positions; said body having second port means between adjacent packer assemblies for communicating said passage with the exterior of said body, said passage of said body opening to the exterior of the body at the upper end of said body whereby fluid under pressure from an external source may be introduced into said passage; said second port means having a restricted orifice whereby the piston means of said packer assemblies move said seal means into expanded positions and into sealing engagement with a flow conductor in which the tester is positioned before the pressure exteriorly of the body between the packer assemblies equals the pressure within said first passage.

2. The tester of claim 1, and means operatively associated with the piston means of one of said packer assemblies closing said second port means to prevent flow of fluid from said passage to the exterior of said body when said piston means of said one of said packer assemblies is in its inoperative position.

3. The tester of claim 1, and tubular means in said body providing with said body a second passage opening to the exterior of the body above the uppermost of said packer assemblies, and below the lowermost of said packer assemblies.

4. The tester of claim 2, and tubular means in said body providing with said body a second passage opening to the exterior of said body above the uppermost of said packer assemblies whereby fluid under pressure may be introduced from an external source to said second passage, said body having a third port means between adjacent packer assemblies other than said first mentioned adjacent packer assemblies connecting said second passage with the exterior of said body between said second mentioned adjacent packer assemblies.

5. The tester of claim 4 wherein said body has means at its upper end for releasably connecting conduits thereto through which fluid under pressure from separate sources may be introduced to said first and second passages.

6. The tester of claim 5, wherein said body has means for controlling opening and closing of said second passage.

7. The tester of claim 1 and latch means for releasably connecting a top portion of said body to a lower portion of said body above the uppermost of said packer assemblies.

8. The tester of claim 1; and an anchor means for anchoring a lower portion of said body against downward movement in a flow conductor connected to the lower end of said body, said anchor means being releasable to permit upward movement of said body upon an upward force being imparted to said body.

9. A tester for testing a flow conductor for leaks, said tester including: an elongate body comprising a top, middle and bottom spaced tubular packer sections, a plurality of tubular spacer sections and a plurality of tubular bypass sections connected in longitudinal alignment, a packer assembly mounted on each of said packer sections, said spacer body sections determining the distances between adjacent packer assemblies; tubes in said body extending between said bypass sections and defining with said body a first inner longitudinal passage and a second outer longitudinal passage each extending continuously from the upper end to the lower portion of said body, at least a portion of said second passage being provided by annular spaces between said tubes and said body, said bypass body sections having bypass passages communicating with said annular spaces and comprising portions of said second outer longitudinal passage; said packer body sections having first port means communicating with said second passage whereby fluid under pressure introduced into said second passage is communicated through said first port means to said packer assemblies to move said packer assemblies from inoperative positions to operative expanded positions for causing said packer assemblies to seal between said body and a flow conductor in which the tester is positionable; said body having second port means communicating one of said first and second passages with the exterior of said body between said top and middle packer assemblies; said body having third port means communicating the other of said first and second passages with the exterior of the body between said middle and bottom packer assemblies; said one of said second and third port means communicating with said second longitudinal passage having a restricted orifice whereby the packer assemblies move to operative expanded positions sealing between said body and the flow conductor in which the tester is positioned before the pressure exteriorly of the body between the packer assemblies with which said one of said second and third port means communicates equals the pressure within said second longitudinal passage; and closure means on one of said packer assemblies initially closing said one of said second and third port means and operable by said one of said packer assemblies for opening said one of said second and third port means after the packer assemblies have been moved to operative expanded positions.

10. The tester of claim 9, wherein said tester has bypass passage means extending past said top packer assembly, and closure means for closing said bypass passage means, said closure means being movable to closed position after gas present exteriorly of said body between said top and middle packer assemblies is displaced upwardly through said bypass passage means past said top packer assembly by liquid flowing to the exterior of said body through said second port means.

11. The tester of claim 10, wherein said middle packer assembly has means closing said second port means when said middle packer assembly is in inoperative position.

12. The tester of claim 11, wherein each of said packer assemblies includes means biasing said packer assemblies toward inoperative position.

13. A tester for testing a flow conductor for leaks, said tester including: an elongate body having a passage; a first packer assembly mounted on said body; a second packer assembly mounted on said body below and spaced longitudinally from said first packer assembly; each of said packer assemblies including external seal means and piston means movable longitudinally on said body for radially expanding said seal means to close the annulus between the tester and a flow conductor in which the tester is insertable; port means in said packer assemblies communicating the body passage with said piston means for transmitting fluid pressure from said passage to said piston means to move said piston means to expand said seal means, said piston means being movable on said body from inoperative positions wherein said seal means are in retracted positions to operative positions wherein said seal means are in expanded positions by fluid under pressure introduced into said passage of said body; said body having lateral port means between said packer assemblies communicating the passage of said body with the exterior of said body between said packer assemblies for permitting fluid introduced into said passage to flow outwardly into the annulus between the body and a flow conductor in which it is inserted between said packer assemblies; said lateral port means having a restricted orifice whereby the piston means of said packer assemblies move said seal means into expanded positions and into a sealing engagement with the flow conductor in which the tester is positioned before the pressure in the annulus exteriorly of the body between the packer assemblies equals the pressure within said passage of said body; and closure means on said piston means of one of said packer assemblies initially closing said lateral port means and movable by said piston means of said one of said packer assemblies to open said lateral port means after said seal means have been expanded, said body having means for connecting a conduit thereto through which fluid under pressure may be conducted to said passage.

14. The tester of claim 13, and means biasing said piston means of said packer assemblies to said inoperative positions.

15. The tester of claim 14, wherein said closure means is operatively associated with said piston means of said second packer assembly closing said port means to prevent flow of fluid from said passage to the exterior of said body when said piston means of said second packer assembly is in its inoperative position.

16. The tester of claim 15, wherein said port means opens to the exterior of the body adjacent said second packer assembly, said tester having a bypass passage opening above and below the seal means of said first packer assembly, and closure means responsive to flow of liquid therepast for closing said bypass passage after air trapped in the annulus between said packer assembly has moved upwardly through said bypass passage and liquid begins to flow into said bypass passage.

17. The tester of claim 16, and a third packer assembly mounted on said body below said second packer assembly, said third packer assembly including external seal means and a piston means movable longitudinally on said body to expand radially said seal means by fluid pressure in said passage; tubular means in said body providing with said body a second passage, said body having a second lateral port between said second and third packer assemblies communicating said second passage with the exterior of said body, said body having means for connecting a conduit thereto through which fluid under pressure may be conducted to said second passage.

18. The tester of claim 17, wherein said piston means of each of said packer assemblies includes a tubular piston slidably mounted on said body, said body having port means adjacent each piston opening to said first mentioned passage for communicating fluid pressure from said first mentioned passage to said pistons.

19. The tester of claim 18, wherein said seal means of each of said packer assemblies is disposed on said pistons, said pistons having means limiting movement of said seal means in one direction relative thereto, and means carried by said body limiting movement of said seal means on a piston in a second direction opposite said one direction whereby when said piston is moved in said second direction said seal means is compressed longitudinally and expanded radially.

20. The tester of claim 19, wherein said piston of said first packer assembly and said body provide an annular chamber, said chamber forming part of said bypass passage, said closure means being longitudinally movable in said chamber and closing said bypass passage when in an upper position in said chamber.

21. The tester of claim 20, said closure means comprising an annular member and seal means carried by said annular member for sealing between said piston of said first packer assembly and said annular member to close said bypass passage when said closure member is in an upper position in said chamber.

22. The tester of claim 21, wherein said annular member has external means for increasing the resistance offered by said annular member to flow of fluid therepast through said chamber.

23. The tester of claim 14, wherein said lateral port means has a restricted orifice whereby said piston means are moved to operative positions after fluid under pressure is introduced into said passage before the pressure exteriorly of said body between said packer assemblies equals the pressure in said passage.

24. The tester of claim 23, and tubular means in said body providing with said body a second passage opening to the exterior of the body above said first packer assembly and below said second packer assembly.

25. The tester of claim 14, wherein said body has a short upper portion and a long lower portion, said packer assemblies being mounted on said lower portion; latch means for releasably securing said upper portion to said lower portion; and anchor means connected to said lower portion for preventing downward movement of said lower portion in a flow conductor and permitting upward movement thereof through a flow conductor upon an upward force being applied to said lower portion.

26. The tester of claim 25, wherein said latch means comprises a latch housing at the top end of said lower portion and a latch device at the bottom end of said upper portion telescopical downwardly into said latch housing, said latch device and said latch housing having releasable coengageable means limiting upward movement of said latch device relative to said latch housing.

27. The tester of claim 26, wherein said anchor means comprises radially expansible anchoring means biased toward radially outer positions and expander means movable longitudinally relative to said anchoring means between a lower operative position wherein said anchoring means are in radially expanded position and upper inoperative positions wherein said anchoring means are free to move radially inwardly.

28. The tester of claim 27, wherein said anchor means includes connector means connecting said expander means to the bottom end of said lower portion of said body, said connector means and said expander means being movable longitudinally a predetermined distance relative to each other.

29. The tester of claim 25, wherein said closure means is operatively associated with said piston means of said second packer assembly to close said port means to prevent flow of fluid from said passage to the exterior of said body when said piston means of said second packer assembly is in its inoperative position.

30. The tester of claim 29, wherein said port means opens to the exterior of the body adjacent said second packer assembly, said tester having a bypass passage opening above and below the seal means of said first packer assembly, and closure means responsive to flow of liquid therepast for closing said bypass passage after air trapped in the annulus between said packer assembly has moved upwardly through said bypass passage and liquid begins to flow into said bypass passage.

31. The tester of claim 30, wherein said piston means of each of said packer assemblies includes a tubular piston slidably mounted on said body, said body having port means adjacent each piston opening to said passage for communicating fluid pressure from said passage to said pistons.

32. The tester of claim 31, wherein said seal means of said packer assemblies are disposed on said piston, said pistons having means limiting movement of said seal means in one direction relative thereto, and mean carried by said body limiting movement of said seal means on said pistons in a second direction opposite said one direction whereby when said pistons are moved in said second direction said seal means are compressed longitudinally and expanded radially.

33. The tester of claim 32, wherein said piston of said first packer assembly and said body provide an annular chamber, said chamber forming part of said bypass passage, said closure means being longitudinally movable in said chamber and closing said bypass passage when in an upper position in said chamber.

34. The tester of claim 33, said closure means comprising an annular member and seal means carried by said annular member for sealing between said piston of said first packer assembly and said annular member to close said bypass passage when said closure member is in an upper position in said chamber.

35. The tester of claim 34, wherein said annular member has external means for increasing the resistance offered by said annular member to flow of fluid therepast through said chamber.

References Cited

UNITED STATES PATENTS

| | | | |
|---|---|---|---|
| 2,998,721 | 9/1961 | Gawlik | 73—40.5 XR |
| 3,048,998 | 4/1962 | Gilreath | 73—40.5 |
| 3,165,920 | 1/1965 | Loomis | 73—40.5 |
| 3,333,459 | 8/1967 | Claycomb | 73—40.5 |

S. CLEMENT SWISHER, *Primary Examiner.*

J. NOLTON, *Assistant Examiner.*

U.S. Cl. X.R.

166—129

UNITED STATES PATENT OFFICE
CERTIFICATE OF CORRECTION

Patent No. 3,420,095                         January 7, 1969

Norman F. Brown et al.

It is certified that error appears in the above identified patent and that said Letters Patent are hereby corrected as shown below:

Column 3, line 2, "brken" should read -- broken --. Column 4, line 64, "spacebody" should read -- spacer body --. Column 6, line 28, "with" should read -- and --. Column 7, line 59, "between the piston and downwardly facily" should read -- ring 307. An O-ring 308 disposed in an internal --. Column 13, line 66, "strand" should read -- stand --.

Signed and sealed this 28th day of April 1970.

(SEAL)
Attest:

Edward M. Fletcher, Jr.                    WILLIAM E. SCHUYLER, JR.

Attesting Officer                              Commissioner of Patents